United States Patent
Inoue et al.

(10) Patent No.: US 10,830,885 B2
(45) Date of Patent: Nov. 10, 2020

(54) PARKING MODE DETERMINING SYSTEM

(71) Applicant: MITSUBISHI ELECTRIC CORPORATION, Tokyo (JP)

(72) Inventors: Satoru Inoue, Tokyo (JP); Ryotaro Suzuki, Tokyo (JP); Wataru Tsujita, Tokyo (JP); Yoshitsugu Sawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 15/735,722

(22) PCT Filed: Oct. 6, 2015

(86) PCT No.: PCT/JP2015/078329
§ 371 (c)(1),
(2) Date: Dec. 12, 2017

(87) PCT Pub. No.: WO2017/060975
PCT Pub. Date: Apr. 13, 2017

(65) Prior Publication Data
US 2018/0180731 A1 Jun. 28, 2018

(51) Int. Cl.
*G01S 13/00* (2006.01)
*G01S 13/931* (2020.01)
(Continued)

(52) U.S. Cl.
CPC ........... *G01S 13/931* (2013.01); *B60W 30/06* (2013.01); *B60W 40/02* (2013.01); *G01S 13/86* (2013.01);
(Continued)

(58) Field of Classification Search
None
See application file for complete search history.

(56) References Cited

U.S. PATENT DOCUMENTS

| 7,924,171 B2 * | 4/2011 | Kawabata | G08G 1/166 340/435 |
| 2009/0128364 A1 * | 5/2009 | Lee | B60Q 9/004 340/932.2 |

(Continued)

FOREIGN PATENT DOCUMENTS

| DE | 102005032095 A1 | 1/2007 |
| DE | 102010947161 A1 | 4/2012 |

(Continued)

OTHER PUBLICATIONS

International Search Report (PCT/ISA/210) issued in PCT/JP2015/078329, dated Jan. 12, 2016.

(Continued)

*Primary Examiner* — Truc M Do
(74) *Attorney, Agent, or Firm* — Birch, Stewart, Kolasch & Birch, LLP

(57) ABSTRACT

A parking mode determining system includes a distance measurer to measure a distance to an obstacle on the side of a host vehicle; a host-vehicle position measurer to measure a position of the host vehicle; a reflected position calculator to calculate a reflected position of the transmission wave; a grouping unit to group a plurality of the reflected positions for each obstacle; an angle calculator to obtain an approximate line for each of two or more of the reflected positions adjacent to each other, and calculate an angle of inclination of the approximate line or an angle of inclination of a normal line of the approximate line; and a parking mode determiner to determine whether a parking mode is parallel parking, perpendicular parking, or angle parking on the basis of a distribution of a plurality of the angles of inclination.

19 Claims, 17 Drawing Sheets

(51) Int. Cl.
*B60W 30/06* (2006.01)
*B60W 40/02* (2006.01)
*G01S 13/86* (2006.01)
*G01S 13/87* (2006.01)
*G01S 15/87* (2006.01)
*G01S 15/86* (2020.01)
*G01S 15/931* (2020.01)
*G01S 19/13* (2010.01)

(52) U.S. Cl.
CPC .............. *G01S 13/87* (2013.01); *G01S 15/86* (2020.01); *G01S 15/87* (2013.01); *G01S 15/931* (2013.01); *G01S 19/13* (2013.01); *B60W 2520/14* (2013.01); *B60W 2520/28* (2013.01); *B60W 2554/00* (2020.02); *B60W 2554/80* (2020.02); *B60W 2556/50* (2020.02); *G01S 2013/932* (2020.01); *G01S 2013/9314* (2013.01); *G01S 2013/9322* (2020.01); *G01S 2013/93271* (2020.01); *G01S 2013/93274* (2020.01); *G01S 2015/932* (2013.01); *G01S 2015/935* (2013.01); *G01S 2015/936* (2013.01)

(56) References Cited

U.S. PATENT DOCUMENTS

2009/0174574 A1* 7/2009 Endo ..................... G01S 13/867
340/932.2
2010/0019935 A1* 1/2010 Kawabata ................. B60R 1/00
340/932.2
2010/0235053 A1* 9/2010 Iwakiri ................ B62D 15/027
701/42
2010/0274446 A1* 10/2010 Sasajima .................. G08G 1/14
701/36
2012/0004809 A1* 1/2012 Sasajima ............. B62D 15/028
701/41
2012/0062396 A1* 3/2012 Inoue .................... G01S 13/931
340/932.2
2013/0096765 A1* 4/2013 Jun ....................... G01S 15/931
701/23
2015/0219760 A1* 8/2015 Hiramaki ................ G01S 7/539
367/99
2016/0280263 A1* 9/2016 Mori ..................... G01S 15/931

FOREIGN PATENT DOCUMENTS

JP  2006-193011 A  7/2006
JP  2007-030700 A  2/2007

OTHER PUBLICATIONS

Office Action issued in corresponding Chinese Application No. 2015 8008 3450.4 dated Mar. 30, 2020.

* cited by examiner

FIG. 11A
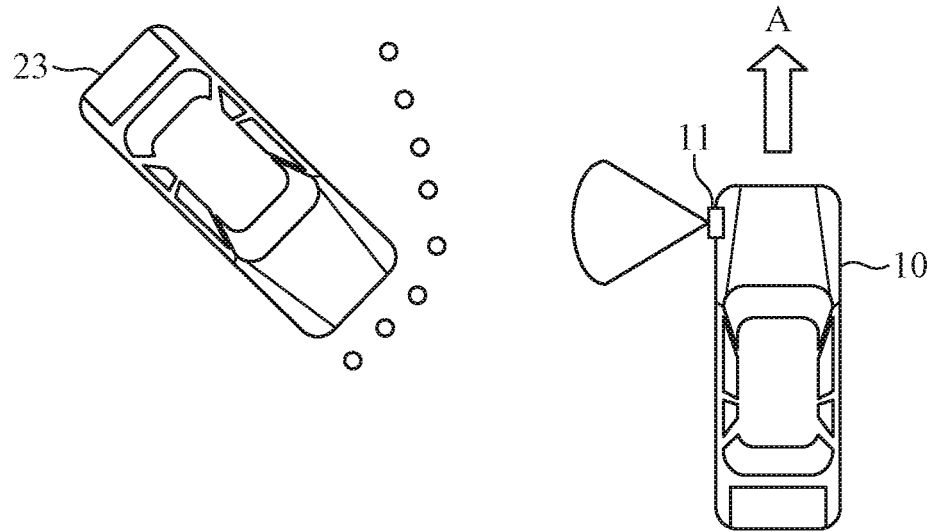
FIG. 11B
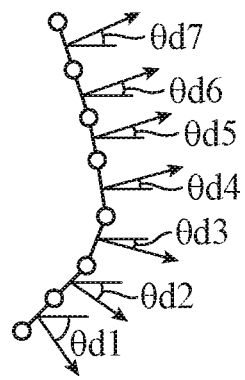
FIG. 11C
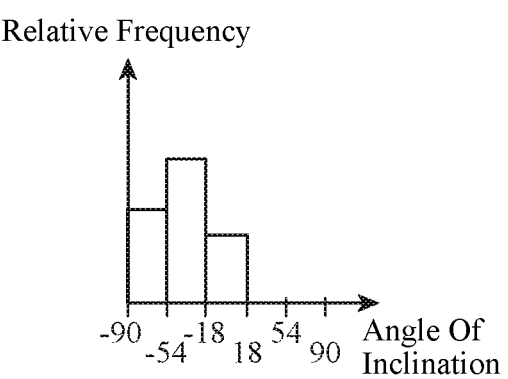
FIG. 12
| Determination Result | Mean | Variance |
|---|---|---|
| Parallel Parking Mode | 0 Degree | Smaller Than Threshold |
| Perpendicular Parking Mode | 0 Degree | Larger Than Or Equal To Threshold |
| Angle Parking Mode | Other Than 0 Degree | Larger Than Or Equal To Threshold |

FIG. 13

| Determination Result | Class Representing Mode L | Ratio L/M |
|---|---|---|
| Parallel Parking Mode | 0 Degree | Larger Than Or Equal To Threshold |
| Perpendicular Parking Mode | 0 Degree | Smaller Than Threshold |
| Angle Parking Mode | Other Than 0 Degree | Larger Than Or Equal To Threshold |

FIG. 14

| Determination Result | Class Representing Mode L | Ratio O/L |
|---|---|---|
| Parallel Parking Mode | 0 Degree | Smaller Than Threshold |
| Perpendicular Parking Mode | 0 Degree | Larger Than Or Equal To Threshold |
| Angle Parking Mode | Other Than 0 Degree | Smaller Than Threshold |

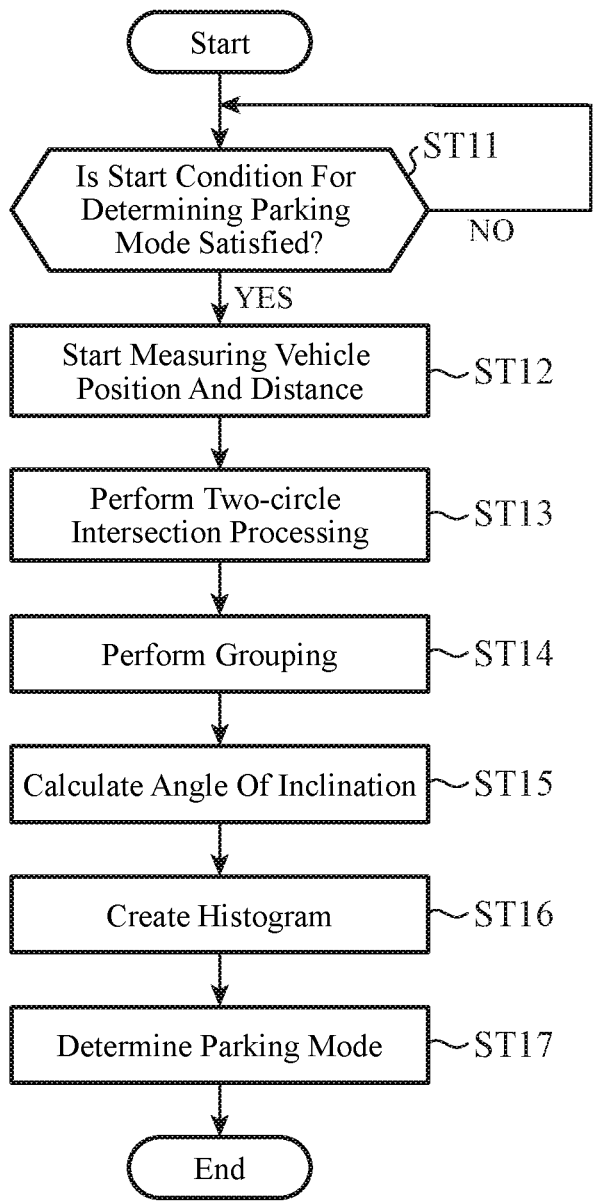

FIG. 20

| Determination Result | Histogram | | Obstacle Size |
|---|---|---|---|
| | Class Representing Mode L | Ratio L/M | |
| Small Object | 0 Degree | Smaller Than Threshold | Smaller Than Lower Limit |
| Perpendicular Parked Vehicle | 0 Degree | Smaller Than Threshold | Larger Than Or Equal To Lower Limit |
| Wall | 0 Degree | Larger Than Or Equal To Threshold | Larger Than Or Equal To Upper Limit |
| Parallel Parked Vehicle | 0 Degree | Larger Than Or Equal To Threshold | Smaller Than Upper Limit |
| Wall | Other Than 0 Degree | Larger Than Or Equal To Threshold | Larger Than Or Equal To Upper Limit |
| Angle Parked Vehicle | Other Than 0 Degree | Larger Than Or Equal To Threshold | Smaller Than Upper Limit |

PARKING MODE DETERMINING SYSTEM

TECHNICAL FIELD

The present invention relates to a parking mode determining system that determines a parking mode by use of distance information measured by a distance sensor mounted on a vehicle.

BACKGROUND ART

A parking assistance device for assisting a driver in driving a vehicle into a parking space has conventionally been employed such that the driver determines whether the parking mode of the parking space is parallel parking or perpendicular parking on the basis of the way a surrounding vehicle is parked to give an instruction to the parking assistance device. This has caused problems that the operation performed by the driver is complicated, the vehicle is misguided when the driver erroneously operates the vehicle, and the like.

Accordingly, there has been proposed a technique in which a device determines the parking mode automatically without a determination by a driver (see Patent Literature 1, for example). The use of such technique eliminates the need for the determination and operation of the device by the driver.

A parking assistance device described in Patent Literature 1 above determines an appropriate parking orientation on the basis of the orientation of an obstacle present on each of both sides of a target parking position. The obstacle is an automobile in many cases. The parking assistance device determines the target parking position at which a vehicle is to be parked, detects obstacles around the target parking position by using a distance sensor such as an ultrasonic sensor, estimates the orientation of the obstacle on each of both sides of the target parking position on the basis of a result of the detection, and determines a target parking orientation which is the orientation of the vehicle at the target parking position.

CITATION LIST

Patent Literature

Patent Literature 1: Japanese Laid-Open Patent Application No. 2006-193011

SUMMARY OF INVENTION

Technical Problem

More specifically, the parking assistance device described in Patent Literature 1 above employs a method by which end points of the obstacles facing the target parking position are estimated to determine the target parking orientation on the basis of the orientation of a straight line connecting the end points. This method does not determine the parking mode and thus possibly makes a false determination that the parking mode is parallel parking mode when the length of an empty space in a parking area of a perpendicular parking mode corresponds to the length of two to three vehicles or more.

Another method is also disclosed in Patent Literature 1 above. This method assumes that a front part of the vehicle can be approximated by a straight line and that a side part of the vehicle can be approximated by a straight line or a quadratic curve with a small curvature. When performing a linear approximation on the front part of the vehicle, the parking assistance device assumes that the orientation orthogonal to the approximate straight line corresponds to a longitudinal axis of the vehicle, that is, the target parking orientation. When a linear approximation is performed with respect to the side part of the vehicle, the orientation of the approximate straight line is assumed to correspond to the target parking orientation. Alternatively, when the side part of the vehicle is approximated by a quadratic curve, the orientation orthogonal to a central axis of the approximate quadratic curve is assumed to correspond to the target parking orientation. However, another method described in Patent Literature 1 has a problem in that the target parking orientation is determined incorrectly when an approximate straight line or an approximate curve is derived by applying an incorrect straight line or curve to the shape of the front part or the side part of the vehicle. Moreover, there is no specific disclosure as to a method of properly using the straight line or curve by which the approximation is performed in accordance with the parking mode of the surrounding vehicles.

Accordingly, there has conventionally been a problem in that a determination of whether the parking mode is parallel parking, perpendicular parking, or angle parking cannot be made automatically.

The present invention has been made to solve the aforementioned problem, and an object of the present invention is to automatically determine whether the parking mode is parallel parking, perpendicular parking, or angle parking.

Solution to Problem

A parking mode determining system according to the present invention includes: a distance measurer to measure a distance to an obstacle present on a side of a host vehicle by using a result of transmission and reception of a transmission wave by a distance sensor; a host-vehicle position measurer to measure a position of the host vehicle; a reflected position calculator to calculate a reflected position of the transmission wave by using the distance measured by the distance measurer and the position of the host vehicle measured by the host-vehicle position measurer; a grouping unit to group a plurality of the reflected positions calculated by the reflected position calculator by the obstacle; an angle calculator to obtain an approximate line for each of two or more of the reflected positions adjacent to each other among a plurality of the reflected positions grouped into the same group, and calculate an angle of inclination of the approximate line or an angle of inclination of a normal line of the approximate line; and a parking mode determiner to determine whether a parking mode is parallel parking, perpendicular parking, or angle parking on the basis of a distribution of a plurality of the angles of inclination calculated from the plurality of the reflected positions grouped into the same group.

Advantageous Effects of Invention

The present invention obtains the approximate line for each of the two or more of the reflected positions adjacent to each other among the plurality of the reflected positions grouped into the same group, calculates the angle of inclination of the approximate line or the angle of inclination of the normal line of the approximate line, and determines whether the parking mode is parallel parking, perpendicular parking, or angle parking on the basis of the distribution of

BRIEF DESCRIPTION OF DRAWINGS

FIGS. 11A to 11C are diagrams for explaining a distribution of angles of inclination of an angle parked vehicle according to the first embodiment.

FIG. 12 is a diagram illustrating an example of a table used by a parking mode determining unit of the first embodiment for determining a parking mode.

FIG. 13 is a diagram illustrating another example of the table used by the parking mode determining unit of the first embodiment for determining the parking mode.

FIG. 14 is a diagram illustrating yet another example of the table used by the parking mode determining unit of the first embodiment for determining the parking mode.

FIG. 15 is a flowchart illustrating an example of the operation of the parking mode determining system according to the first embodiment.

FIG. 20 is a diagram illustrating an example of a table used by a parking mode determining unit of the third embodiment for determining a parking mode and a type of an obstacle.

DESCRIPTION OF EMBODIMENTS

Embodiments for carrying out the present invention will now be described with reference to the drawings in order to describe the present invention in more detail.

First Embodiment

Figure 1:
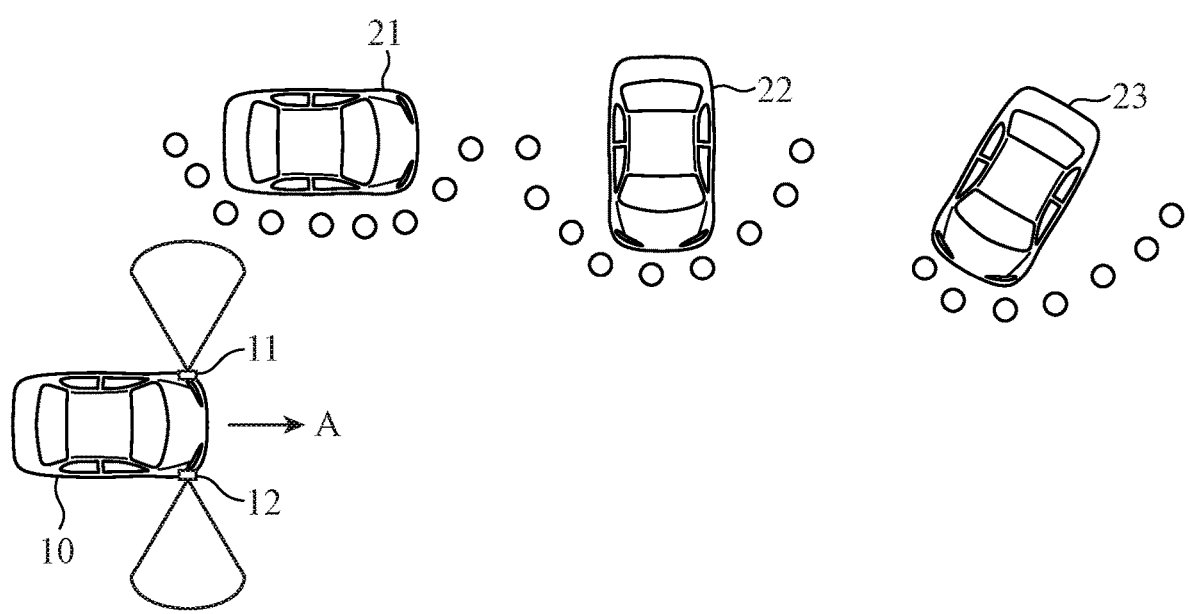
FIG. 1 is a diagram for explaining an overview of a method of determining a parking mode according to the present invention.

FIG. 1 is a diagram for explaining an overview of a method of determining a parking mode according to the present invention. A vehicle 10 in FIG. 1 is a vehicle equipped with a parking mode determining system according to the present invention. The vehicle 10 is also equipped with distance sensors 11 and 12 on left and right sides of a front part of the vehicle. Each of the distance sensors 11 and 12 transmits a transmission wave laterally from the vehicle 10 while the vehicle 10 travels in a direction of travel A near a parked vehicle such as a parallel parked vehicle 21, a perpendicular parked vehicle 22, or an angle parked vehicle 23, and receives the transmission wave reflected by the parked vehicle being an obstacle as a reflected wave. The parking mode determining system uses a result of the transmission and reception by the distance sensors 11 and 12 to calculate reflected positions indicated by circles, for example, and uses the reflected positions to determine the parking mode of the parked vehicle.

The distance sensors used by the parking mode determining system may be any sensors sensing the left and right sides of the vehicle 10. Although FIG. 1 illustrates an example of using the two distance sensors 11 and 12 installed on the front side of the vehicle 10, two distance sensors installed on a rear side or four distance sensors installed on the front side and the rear side may be used as well.

The distance sensors 11 and 12 may each be one that can measure the distance from the vehicle 10 to an obstacle by transmitting and receiving the transmission wave such as an ultrasonic sensor that transmits and receives an ultrasonic wave as the transmission wave or a radar that transmits and receives a radio wave.

Figure 2:
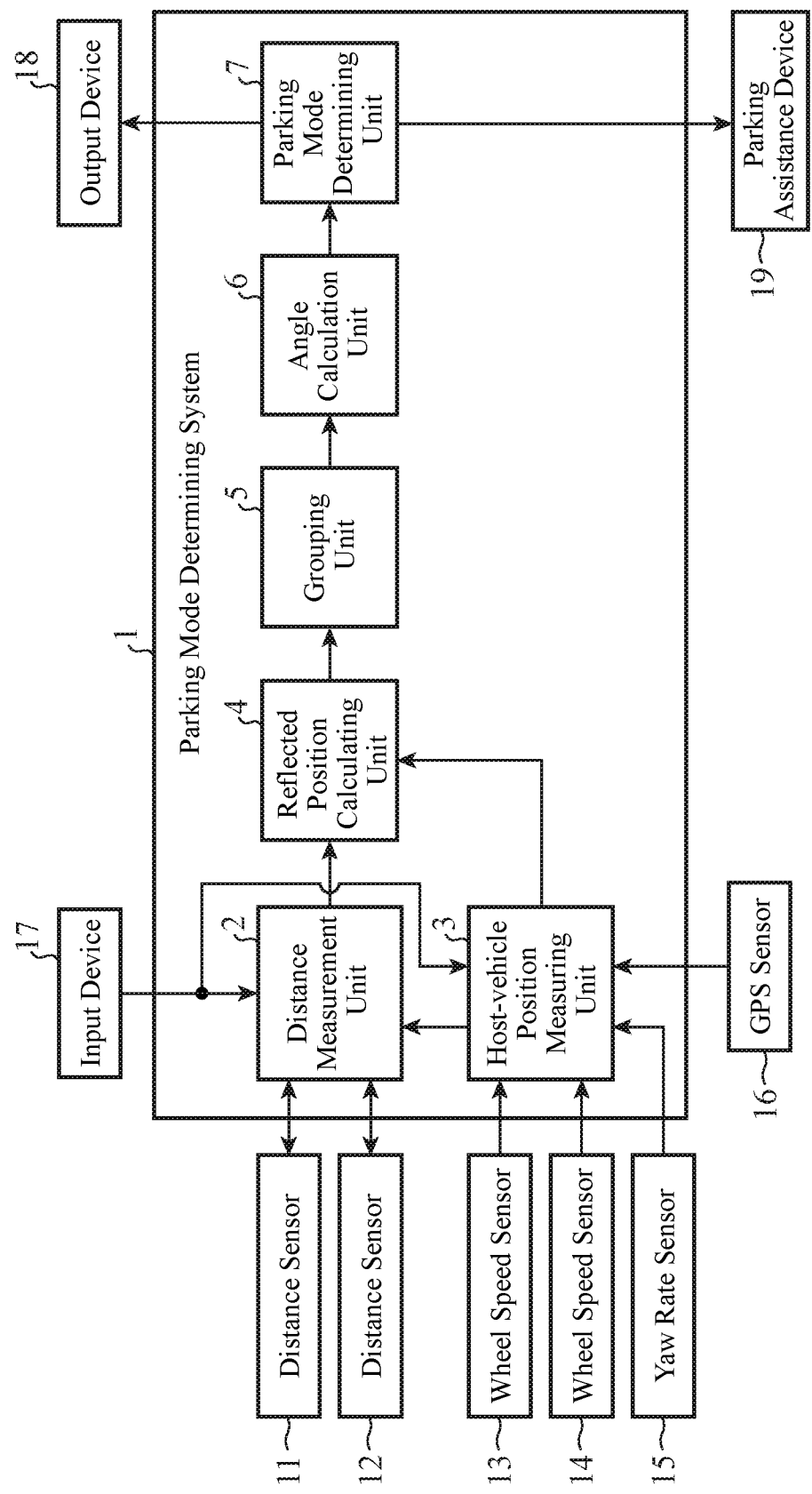
FIG. 2 is a block diagram illustrating an example of the configuration of a parking mode determining system 1 according to a first embodiment.

FIG. 2 is a block diagram illustrating an example of the configuration of a parking mode determining system 1 according to a first embodiment of the present invention. The parking mode determining system 1 includes a distance measuring unit 2, a host-vehicle position measuring unit 3, a reflected position calculating unit 4, a grouping unit 5, an angle calculating unit 6, and a parking mode determining unit 7. The parking mode determining system 1 is also electrically connected to the left and right distance sensors 11 and 12, left and right wheel speed sensors 13 and 14, a yaw rate sensor 15, a global positioning system (GPS) sensor 16, an input device 17, an output device 18, and a parking assistance device 19 that are mounted on the vehicle 10.

The distance sensors 11 and 12 each output, to the distance measuring unit 2, the result of the transmission and reception of the transmission wave transmitted laterally from the vehicle 10. The wheel speed sensors 13 and 14 detect speeds of left and right wheels of the vehicle 10 and output the speeds to the host-vehicle position measuring unit 3. The yaw rate sensor 15 detects a yaw rate of the vehicle 10 and outputs the yaw rate to the host-vehicle position measuring unit 3. The GPS sensor 16 receives a radio wave from a GPS satellite and outputs the radio wave to the host-vehicle position measuring unit 3.

The input device 17 is, for example, a touch panel disposed on a display or a button provided on a casing of the parking mode determining system 1. The input device 17 receives a driver's operation on the button or the like, and outputs a signal indicating details of the operation to the parking mode determining system 1.

FIG. 2 illustrates an example in which the input device 17 receives a sign from the driver to start determining the parking mode and outputs the sign to the distance measuring unit 2 and the host-vehicle position measuring unit 3. Alternatively, the input device 17 may be a lighting switch for a hazard lamp of the vehicle 10, accept turning on of the lighting switch as a sign to start determining the parking mode, and output a signal that gives an instruction to start determining the parking mode to the distance measuring unit 2 and the host-vehicle position measuring unit 3. Still alternatively, the input device 17 may be a shift lever of the vehicle 10, accept the shifting of the shift lever to a parking range as a sign to start determining the parking mode, and output a signal that gives an instruction to start determining the parking mode to the distance measuring unit 2 and the host-vehicle position measuring unit 3.

The output device 18 is a display or a speaker, for example. The output device 18 receives information to be displayed from the parking mode determining system 1 and displays the information on the display. Alternatively, the output device 18 receives voice information to be output from the parking mode determining system 1 and outputs the information from the speaker. FIG. 2 illustrates an example in which the output device 18 receives a result of the determination of the parking mode from the parking mode determining unit 7 and displays the result on the display or outputs the result from the speaker.

The parking assistance device 19 receives the result of the determination of the parking mode from the output device 18 and assists in performing a parking operation of the vehicle 10 corresponding to the parking mode. A technique for assisting in performing the operation of the vehicle 10 at the time of parking may use a known technique and thus will not be described. Note that the parking assistance device 19 may perform automatic parking of the vehicle 10 by unmanned traveling while using the result of the determination of the parking mode.

Figure 3:
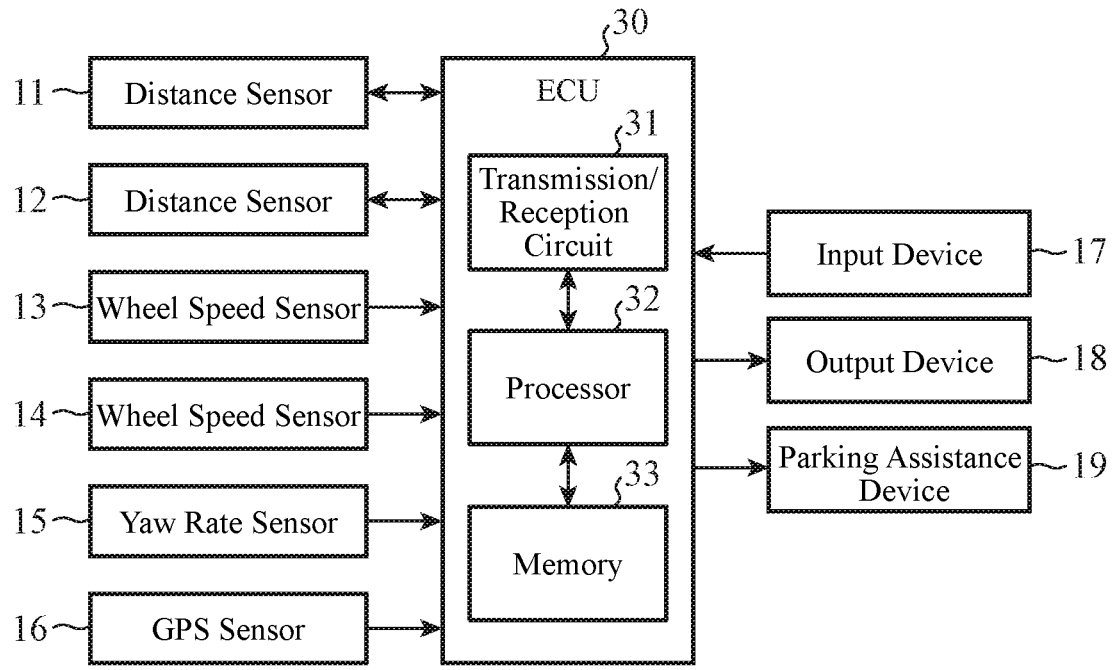
FIG. 3 is a diagram illustrating an example of the hardware configuration of the parking mode determining system according to the first embodiment.

FIG. 3 is a diagram illustrating an example of the hardware configuration of the parking mode determining system 1. The parking mode determining system 1 includes an electronic control unit (ECU) 30, for example. The ECU 30 includes a transmission/reception circuit 31, a memory 33, and a processor 32 that executes a program stored in the memory 33. The transmission/reception circuit 31 is a circuit that causes each of the distance sensors 11 and 12 to transmit the transmission wave and receives the reflected wave received by each of the distance sensors 11 and 12.

Functions of the distance measuring unit 2, the host-vehicle position measuring unit 3, the reflected position calculating unit 4, the grouping unit 5, the angle calculating unit 6, and the parking mode determining unit 7 in the parking mode determining system 1 are implemented by software, firmware, or a combination of software and firmware. The software or firmware is described as a program and stored in the memory 33. The processor 32 reads and executes the program stored in the memory 33, thereby implementing the functions of the aforementioned units. That is, the parking mode determining system 1 includes the memory 33 for storing the program that is executed by the processor 32 to consequently execute a step of measuring a distance to an obstacle, a step of measuring the position of the host vehicle, a step of calculating a reflected position of the transmission wave on the obstacle by using the distance and the position of the host vehicle, a step of grouping a plurality of the reflected positions for each obstacle, a step of obtaining an approximate line for two or more reflected positions adjacent to each other among a plurality of the reflected positions grouped into the same group and calculating the angle of inclination of the approximate line or the angle of inclination of a normal line of the approximate line, and a step of determining the parking mode on the basis of a distribution of a plurality of the angles of inclination in the same group. It can also be said that the program causes a computer to execute a procedure or method pertaining to the distance measuring unit 2, the host-vehicle position measuring unit 3, the reflected position calculating unit 4, the grouping unit 5, the angle calculating unit 6, and the parking mode determining unit 7.

Here, the processor 32 refers to a central processing unit (CPU), a central processor, a processing unit, an arithmetic unit, a microprocessor, a microcomputer, or a digital signal processor (DSP), for example.

The memory 33 is a volatile semiconductor memory or a non-volatile semiconductor memory such as a random access memory (RAM), a read only memory (ROM), a flash memory, an erasable programmable ROM (EPROM), or an electrically EPROM (EEPROM).

Next, details of the parking mode determining system 1 will be described.

The distance measuring unit 2 receives, from the distance sensor 11, a piece of information on time required from the transmission to the reception of the transmission wave as the result of the transmission and reception of the transmission wave. The distance measuring unit 2 then measures the distance to an obstacle present on the side of the vehicle 10 by using the result of the transmission and reception, and outputs distance data to the reflected position calculating unit 4.

As for the distance sensor 12, the distance measuring unit 2 also measures the distance in a manner similar to that described above, and outputs distance data to the reflected position calculating unit 4.

Existing products can be used as the distance sensors 11 and 12 since the sensors are often mounted on the vehicle 10. Alternatively, the parking mode determining system 1 may include the distance sensors 11 and 12.

The host-vehicle position measuring unit 3 receives a result of the reception of the radio wave from the GPS sensor 16, measures the position of the host vehicle, and outputs vehicle position data to the reflected position calculating unit 4.

An existing product can be used as the GPS sensor 16 since the sensor is often mounted on the vehicle 10. In addition, an absolute position can be measured by positioning using the GPS sensor 16 and is thus useful for automatic parking performed by unmanned traveling.

The position of the host vehicle is measured not just by the aforementioned method using the GPS sensor 16. Here, a method using the wheel speed sensors 13 and 14 and the yaw rate sensor 15 will be described.

The host-vehicle position measuring unit 3 receives the wheel speeds of the vehicle 10 from the wheel speed sensors 13 and 14 and converts them into the traveling speed. The host-vehicle position measuring unit 3 also receives the yaw rate of the vehicle 10 from the yaw rate sensor 15. Then, the host-vehicle position measuring unit 3 calculates a variation $\Delta\theta_i$ in the direction of travel per unit time from the yaw rate, and calculates a distance $\Delta D_i$ traveled per unit time from the traveling speed. Subsequently, the host-vehicle position measuring unit 3 uses the following expressions (1), (2), and (3) in combination with the known position $(x_{i-1}, y_{i-1})$ and bearing $\theta_{i-1}$ of the host vehicle to calculate the current position $(x_i, y_i)$ and bearing $\theta_i$ of the host vehicle.

$$\theta_i = \theta_{i-1} + \Delta\theta_i \quad (1)$$

$$x_i = x_{i-1} + \Delta D_i \sin\theta_i \quad (2)$$

$$y_i = y_{i-1} + \Delta D_i \cos\theta_i \quad (3)$$

Existing products can be used as the wheel speed sensors 13 and 14 and the yaw rate sensor 15 since the sensors are often mounted on the vehicle 10. This method can also measure the position of the host vehicle even when the vehicle 10 travels out of reach of the radio wave from the GPS satellite.

The host-vehicle position measuring unit 3 may measure the position of the host vehicle by using the GPS sensor 16, by using the wheel speed sensors 13 and 14 and the yaw rate sensor 15, or by using the GPS sensor 16, the wheel speed sensors 13 and 14, and the yaw rate sensor 15.

Moreover, a more accurate position of the host vehicle can be measured by applying the following method which measures the position of the host vehicle to a third embodiment described later, so that measurement errors associated with the parking space and the obstacle size can be reduced. As a result, the accuracy of determining the parking mode is improved.

Figure 22:
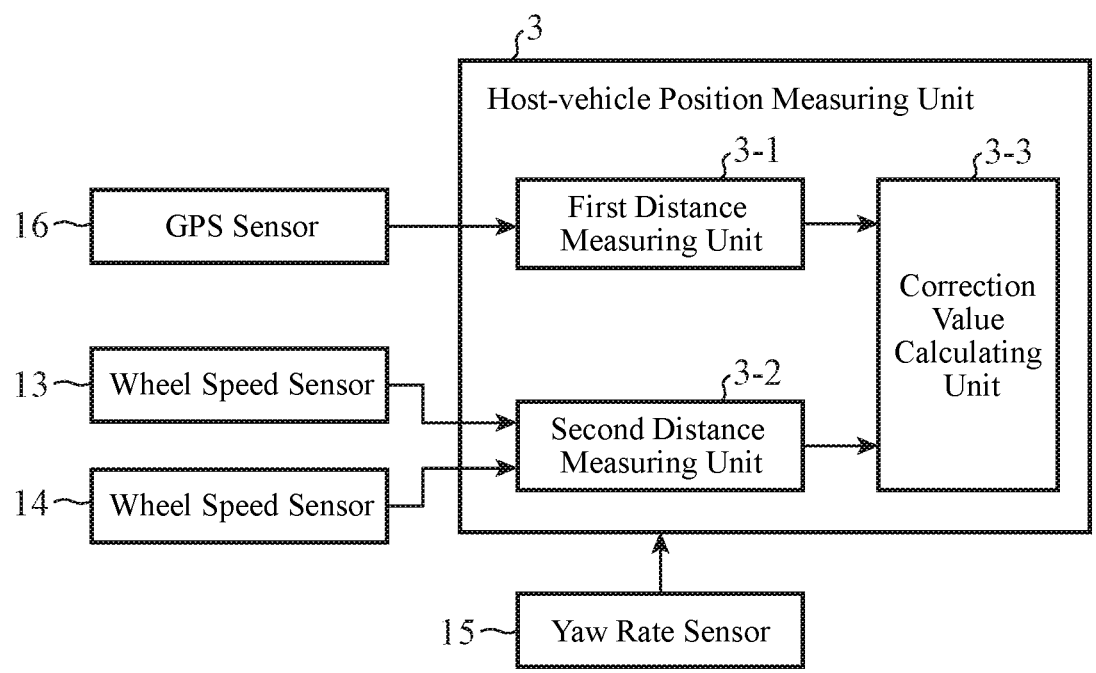
FIG. 22 is a block diagram illustrating an example of the configuration of a host-vehicle position measuring unit of the parking mode determining system according to each of the embodiments of the present invention.

Here, there will be described an example of the case where the GPS sensor 16, the wheel speed sensors 13 and 14, and the yaw rate sensor 15 are used. It is assumed hereinafter that an error associated with the wheel speed sensors 13 and 14 is corrected by using the GPS sensor 16, and FIG. 22 illustrates an example of the configuration of the host-vehicle position measuring unit 3.

When the vehicle 10 travels straight ahead by a distance D a plurality of times, distances D1 measured a plurality of times by the GPS sensor 16 vary, and the mean value of distances D1 is represented as D, and a standard deviation is represented as $\sigma 1$. The distance is expressed by an expression $D1 = D \pm \sigma 1$. The standard deviation $\sigma 1$ is defined by a reception condition of the radio wave and a signal-to-noise ratio of a received signal.

On the other hand, when the vehicle travels straight ahead by the distance D a plurality of times, distances D2 measured a plurality of times by the wheel speed sensors 13 and 14 also vary, and the mean value of distances D2 is represented as $D-\Delta D$, and a standard deviation is represented as $\sigma 2$. The distance is expressed by an expression $D2 = D - \Delta D \pm \sigma 2$. The value of $\Delta D$ equals zero when an actual wheel diameter R corresponds with a wheel diameter control value R' used to convert a wheel speed pulse into the distance. In the absence of idling or sliding of the wheels, the standard deviation $\sigma 2$ is defined by a pulse quantization error or the like.

As described above, the accuracy of the GPS sensor 16 with the measurement error being a sequential error is different from the accuracy of the wheel speed sensors 13 and 14 with the measurement error being a cumulative error, so that the distance D1 measured by the GPS sensor 16 is different from the distance D2 measured by the wheel speed sensor 13 and 14.

The actual distance traveled D, the distance D2 measured by the wheel speed sensors 13 and 14, the actual wheel diameter R, and the wheel diameter control value R' satisfy the relationships of the following expressions (4) and (5).

$$R/R' = D/D2 \quad (4)$$

$$R = R' \times D/D2 \quad (5)$$

The host-vehicle position measuring unit 3 cannot measure the actual distance traveled D, so that the distance D1 measured by the GPS sensor 16 is used instead in the above expressions (4) and (5). That is, the above expressions (4) and (5) can be expressed as the following expressions (4a) and (5a).

$$R/R' = D1/D2 \quad (4a)$$

$$R = R' \times D1/D2 \quad (5a)$$

A first distance measuring unit 3-1 illustrated in FIG. 22 uses the GPS sensor 16 with the measurement error being the sequential error to measure the distance D1 traveled by the vehicle 10. A second distance measuring unit 3-2 uses the wheel speed sensors 13 and 14 with the measurement error being the cumulative error to measure the distance D2 traveled by the vehicle 10. A correction value calculating unit 3-3 uses the distance D1 measured by the first distance measuring unit 3-1 and the distance D2 measured by the second distance measuring unit 3-2 to calculate the wheel diameter R at regular intervals by expressions (4a) and (5a), for example. The host-vehicle position measuring unit 3 replaces the wheel diameter control value R' with the wheel diameter R calculated by the correction value calculating unit 3-3 to measure the position of the host vehicle by using the wheel speed sensors 13 and 14 and the yaw rate sensor 15. That is, the wheel diameter R is a correction value for the measurement of the position of the host vehicle. As a result, the error between the wheel diameter R and the wheel diameter control value R' can be corrected so that a more accurate position of the host vehicle can be measured.

Furthermore, the host-vehicle position measuring unit 3 can reduce the influence of the standard deviation $\sigma 1$ of the distance D1 measured by the GPS sensor 16 by calculating the wheel diameter R at a plurality of points.

The reflected position calculating unit 4 receives the distance data from the distance measuring unit 2 as well as the host-vehicle position data from the host-vehicle position measuring unit 3. The host-vehicle position measuring unit 3 calculates a sensor position being the position of the distance sensor 11 or 12 by using the host-vehicle position data obtained when the distance sensor 11 or 12 measures the distance, namely when the sensor transmits and receives the transmission wave. The host-vehicle position measuring unit 3 further links data of the sensor position being calculated with distance data measured at the sensor position to form a set of data.

Note that information on the installation positions of the distance sensors 11 and 12 on the vehicle 10 is required for calculating the sensor position and is preset in the reflected position calculating unit 4.

The reflected position calculating unit 4 calculates one reflected position by using the set of data including the sensor position data and the distance data and a direction in which the distance sensors 11 and 12 have the maximum directivity. The reflected position calculating unit 4 outputs data on the reflected position data being calculated to the grouping unit 5. Note that the direction in which the distance sensors 11 and 12 have the maximum directivity is referred to as a "direction of maximum directivity". It is assumed that information on the direction of maximum directivity is preset in the reflected position calculating unit 4.

Figure 4:
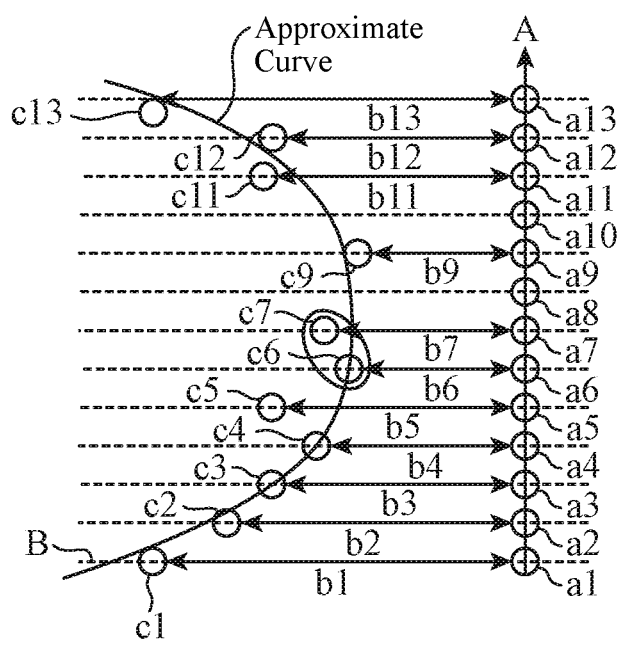
FIG. 4 is a diagram for explaining a method by which a reflected position calculating unit of the first embodiment calculates a reflected position by using a direction of maximum directivity of a distance sensor.

FIG. 4 is a diagram for explaining a method of calculating a reflected position by using the direction of maximum directivity of the distance sensor 11. FIG. 4 illustrates sensor position data a1 to a13 and distance data b1 to b7, b9, and b11 to 13 obtained when the vehicle 10 travels in the direction of travel A. Moreover, a broken line indicates a direction of maximum directivity B of each of the sensor position data a1 to a13 of the distance sensor 11.

The reflected position calculating unit 4 calculates a position away from the sensor position data a1 by the distance data b1 along the direction of maximum directivity B, and sets this position as reflected position data c1. Similarly, the reflected position calculating unit 4 calculates reflected positions c2 to c7, c9, and c 11 to c13 on the direction of maximum directivity B by using the sensor position data a2 to a13 and the distance data b2 to b7, b9, and b11 to b13.

Figure 5:
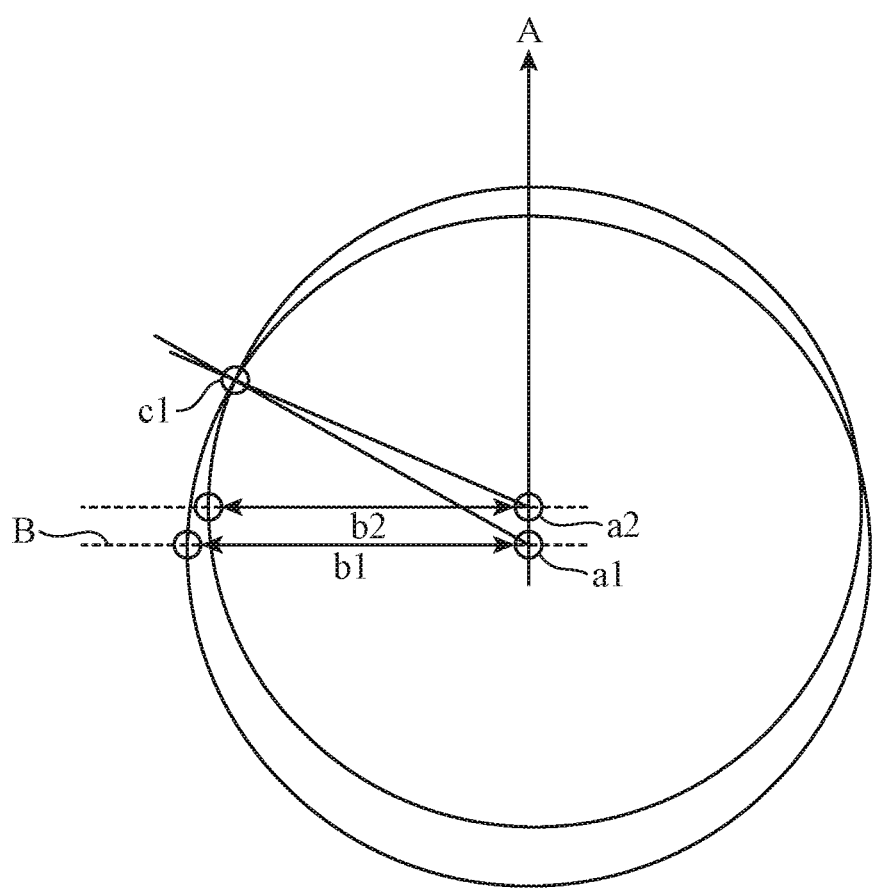
FIG. 5 is a diagram for explaining a method by which the reflected position calculating unit of the first embodiment calculates the reflected position by two-circle intersection processing.

FIG. 5 is a diagram for explaining a method of calculating the reflected position by using a known technique called two-circle intersection processing as a method different from the method described in FIG. 4. FIG. 5 illustrates the sensor position data a1 and the distance data b1 as well as the sensor position data a2 and the distance data b2 obtained when the vehicle 10 travels in the direction of travel A. Moreover, a broken line indicates the direction of maximum directivity B of each of the sensor position data a1 and a2 of the distance sensor 11.

The reflected position calculating unit 4 obtains a circle centered on the sensor position data a1 and having the distance data b1 as a radius. Similarly, the reflected position calculating unit 4 obtains a circle centered on the sensor position data a2 and having the distance data b2 as a radius. The reflected position calculating unit 4 then calculates a position of the intersection of the two circles obtained, and sets this position of the intersection as the reflected position data c1.

Compared to the calculation using the direction of maximum directivity, the calculation by the two-circle intersection processing can obtain the reflected position more accurately following the outline of an obstacle. However, the two-circle intersection processing requires more time in the calculation than the calculation processing using the direction of maximum directivity.

The grouping unit 5 receives the reflected position data from the reflected position calculating unit 4, groups the reflected position data for each obstacle, and outputs the data to the angle calculating unit 6.

More specifically, the grouping unit 5 determines that reflected position data adjacent to each other belongs to the same group when the distance between the reflected position data adjacent to each other is shorter than or equal to a predetermined threshold, or determines that reflected position data adjacent to each other belongs to different groups when the distance between the reflected position data adjacent to each other is longer than a predetermined threshold.

The grouping unit 5 extracts the reflected position data adjacent to each other with respect to the position indicated by the sensor position data of the distance sensors 11 and 12. In this case, the reflected position data c6 and c7 corresponding to the sensor position data a6 and a7 adjacent to each other in FIG. 4 are extracted, followed by the determination of whether or not the distance between the reflected position data c6 and c7 is shorter than or equal to the threshold.

Alternatively, the grouping unit 5 may extract reflected position data adjacent to each other with respect to the shortest distance between the reflected position data. In this case, for the reflected position data c6 in FIG. 4, the reflected position data c7 located at the shortest distance from the reflected position data c6 is selected so that the reflected position data c6 and c7 are extracted as the reflected position data adjacent to each other.

The threshold used by the grouping unit 5 for grouping is a value that distinguishes an obstacle such as a parked vehicle from a parking space.

The grouping unit 5 may change the threshold used for grouping in accordance with the traveling speed of the vehicle 10 or the frequency of sensing performed by the distance sensors 11 and 12. The grouping unit 5 uses a large threshold when the traveling speed is high or the sensing frequency is low, and uses a small threshold when the traveling speed is low or the sensing frequency is high. It is assumed that the correspondence between the traveling speed or the sensing frequency and the threshold is preset in the grouping unit 5.

Figure 6:
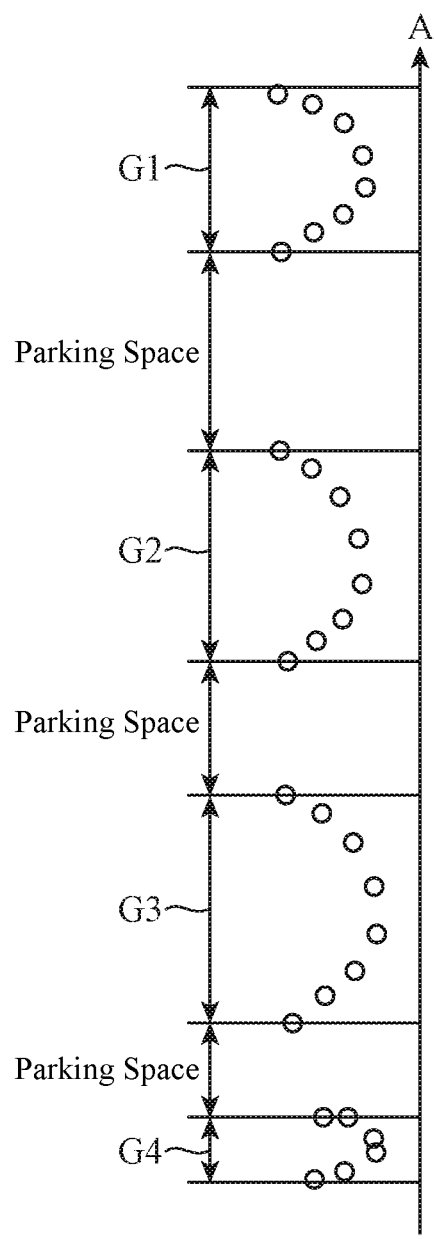
FIG. 6 is a diagram illustrating an example of a reflected position data group obtained by grouping reflected position data by a grouping unit of the first embodiment.

FIG. 6 is a diagram illustrating an example of a reflected position data group obtained by grouping the reflected position data. In FIG. 6, a plurality of reflected position data obtained when the vehicle 10 travels in the direction of travel A is grouped into four reflected position data groups G1 to G4. With no obstacle present in a space between the reflected position data groups, the parking mode determining system 1 regards the space as a parking space.

The angle calculating unit 6 receives the grouped reflected position data from the grouping unit 5. Then, the angle calculating unit 6 obtains an approximate line for two or more reflected position data adjacent to each other among the plurality of reflected position data included in the same group, and calculates the angle of inclination of the approximate line or the angle of inclination of a normal line of the approximate line. The angle calculating unit 6 calculates the angles of inclination for all the reflected position data included in the same group, and outputs the angles being calculated to the parking mode determining unit 7.

Note that the angle calculating unit 6 may extract the reflected position data adjacent to each other with a position indicated by the sensor position data as a reference, or with the shortest distance between the reflected position data as a reference.

Figure 7:
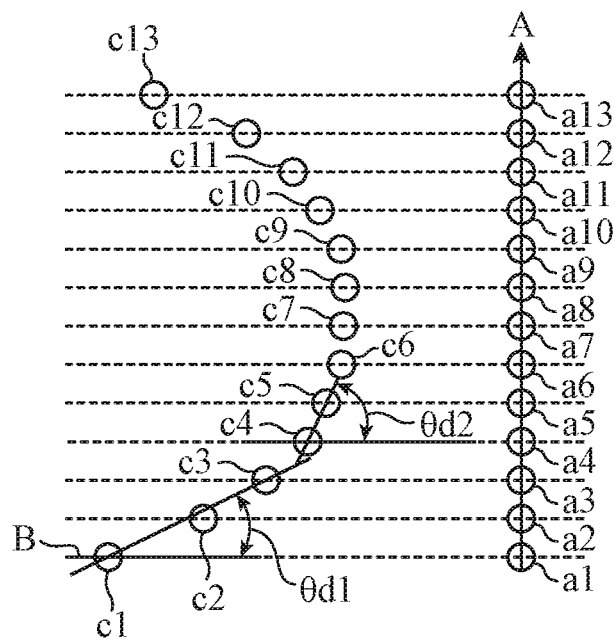
FIG. 7 is a diagram illustrating a method by which an angle calculating unit of the first embodiment calculates an angle of inclination of an approximate line.

FIG. 7 is a diagram illustrating a method of calculating the angle of inclination of the approximate line. FIG. 7 illustrates the reflected position data c1 to c13 in the same group obtained when the vehicle 10 travels in the direction of travel A. The angle calculating unit 6 obtains an approximate line for the three reflected position data c1 to c3 to calculate an angle of inclination $\theta d1$ of the approximate line. Although the angle calculating unit 6 calculates the angle of inclination $\theta d1$ of the approximate line with respect to the direction of maximum directivity B as a reference axis in the example of FIG. 7, the reference axis is not limited to the direction of maximum directivity B but may be the direction of travel A, for example.

The angle calculating unit 6 further obtains an approximate line for the two reflected position data c4 and c5 to calculate an angle of inclination θd2 of the approximate line.

The angle calculating unit 6 repeats the above processing to calculate angles of inclination while using all of the reflected position data c1 to c13 in any calculation.

Figure 8:
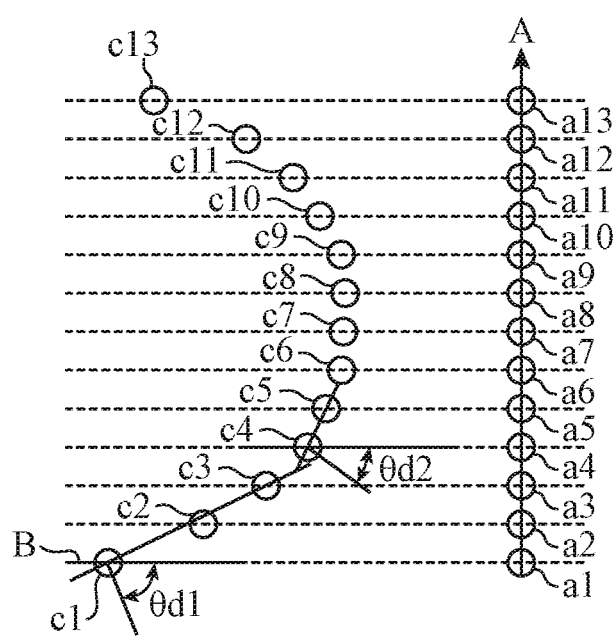
FIG. 8 is a diagram illustrating a method by which the angle calculating unit of the first embodiment calculates an angle of inclination of a normal line of the approximate line.

FIG. 8 is a diagram illustrating a method of calculating the angle of inclination of a normal line of an approximate line. FIG. 8 illustrates the reflected position data c1 to c13 in the same group obtained when the vehicle 10 travels in the direction of travel A. The angle calculating unit 6 obtains an approximate line for the three reflected position data c1 to c3 to calculate an angle of inclination θd1 of a normal line of the approximate line. Although the angle calculating unit 6 calculates the angle of inclination θd1 of the normal line with respect to the direction of maximum directivity B as a reference axis in the example of FIG. 8, the reference axis is not limited to the direction of maximum directivity B but may be the direction of travel A, for example.

The angle calculating unit 6 further obtains an approximate line for the two reflected position data c4 and c5 to calculate an angle of inclination θd2 of the approximate line.

The angle calculating unit 6 repeats the above processing to calculate angles of inclination while using all of the reflected position data c1 to c13 in any calculation.

Note that although the approximate straight line is obtained for the reflected position data c1 to c3 in the examples of FIGS. 7 and 8, an approximate curve may instead be obtained. When obtaining an approximate curve, the angle calculating unit 6 may calculate the angle of inclination of a tangent at an appropriate point on the approximate curve with respect to a reference axis, or the angle of inclination of a normal line at an appropriate point on the approximate curve with respect to a reference axis.

The parking mode determining unit 7 receives, from the angle calculating unit 6, the plurality of angles of inclination calculated from the plurality of reflected position data included in the same group. Then, on the basis of a distribution of all the angles of inclination included in the same group, the parking mode determining unit 7 determines whether the parking mode of the group is parallel parking, perpendicular parking, or angle parking, and outputs a result of the determination to the output device 18 or the parking assistance device 19.

Here, a distribution of angles of inclination for each of a parallel parked vehicle, a perpendicular parked vehicle, and an angle parked vehicle will be described with reference to FIGS. 9 to 11. FIGS. 9A to 9C illustrate the case of parallel parking, FIGS. 10A to 10C illustrate the case of perpendicular parking, and FIGS. 11A to 11C illustrate the case of angle parking.

Figure 9A:
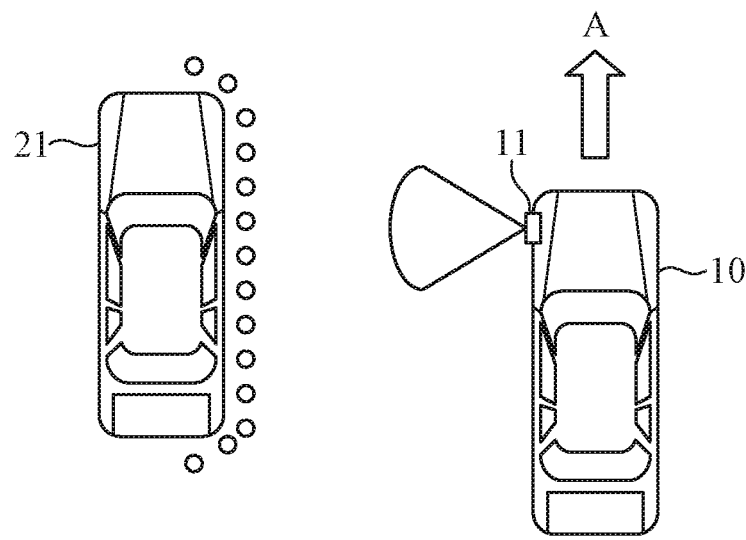
FIGS. 9A to 9C are diagrams for explaining a distribution of angles of inclination of a parallel parked vehicle according to the first embodiment.
Figure 9B:
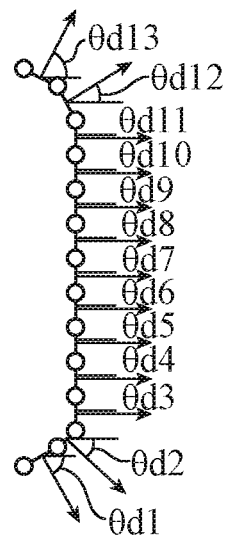

When the distance sensor 11 of the vehicle 10 transmits and receives a transmission wave to and from the parallel parked vehicle 21 as illustrated in FIG. 9A, reflected position data along the outline of the parallel parked vehicle 21 as indicated by circles is obtained upon plotting distance data on a two-dimensional plane composed of the longitudinal direction and the lateral direction of the vehicle 10. As illustrated in FIG. 9B, the angle calculating unit 6 obtains approximate lines for the reflected position data adjacent to each other and calculates angles of inclination θd1 to θd13 of normal lines of the approximate lines by the following expression (6). The parking mode determining unit 7 creates a histogram as illustrated in FIG. 9C by using the angles of inclination θd1 to θd13.

$$\theta dm = \tan^{-1}\left(-\frac{x_2 - x_1}{y_2 - y_1}\right) \quad (6)$$

Here, θdm represents the angle of inclination of a normal line of an approximate line with m=1 to 13. When the angle of inclination is calculated for every two reflected position data adjacent to each other as illustrated in FIG. 9B, and when the total number of the reflected position data is represented by N, the total number M of the angles of inclination θdm equals N−1.

In addition, $(x_1, y_1)$ and $(x_2, y_2)$ represent the coordinates of the two reflected position data adjacent to each other.

Figure 10A:
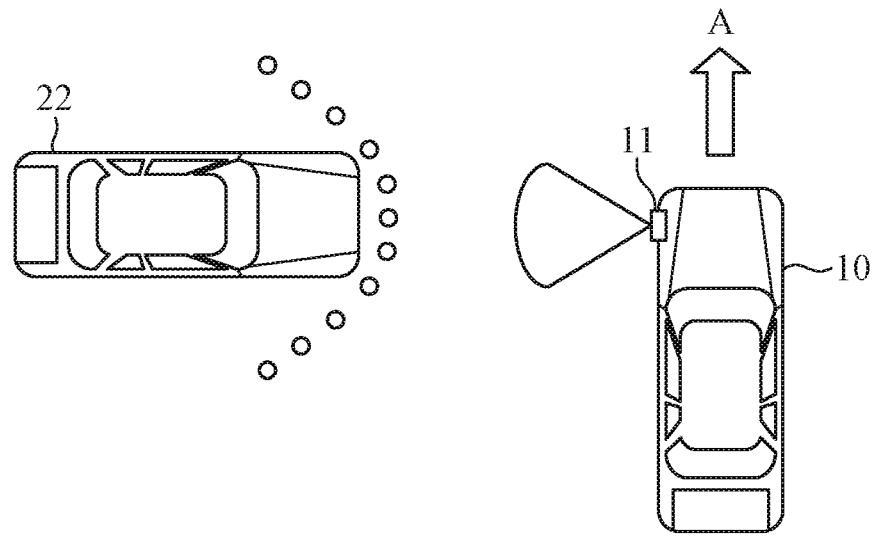
FIGS. 10A to 10C are diagrams for explaining a distribution of angles of inclination of a perpendicular parked vehicle according to the first embodiment.

When the distance sensor 11 of the vehicle 10 transmits and receives a transmission wave to and from the perpendicular parked vehicle 22 as illustrated in FIG. 10A, reflected position data along the outline of the perpendicular parked vehicle 22 is obtained as indicated by circles. As illustrated in FIG. 10B, the angle calculating unit 6 obtains approximate lines for the reflected position data adjacent to each other and calculates angles of inclination θd1 to θd10 of normal lines of the approximate lines. The parking mode determining unit 7 creates a histogram as illustrated in FIG. 10C by using the angles of inclination θd1 to θd10.

When the distance sensor 11 of the vehicle 10 transmits and receives a transmission wave to and from the angle parked vehicle 23 as illustrated in FIG. 11A, reflected position data along the outline of the angle parked vehicle 23 is obtained as indicated by circles. As illustrated in FIG. 11B, the angle calculating unit 6 obtains approximate lines for the reflected position data adjacent to each other and calculates angles of inclination θd1 to θd7 of normal lines of the approximate lines. The parking mode determining unit 7 creates a histogram as illustrated in FIG. 11C by using the angles of inclination θd1 to θd7.

The parking mode determining unit 7 creates a histogram with a class interval and the number of classes that are predetermined. In the example of each of FIGS. 9C, 10C, and 11C, the parking mode determining unit 7 creates a histogram by dividing the range of ±90 degrees into five classes with the equal class interval. In this histogram, for example, a class including the angle of inclination from −18 degrees to 18 degrees is called a zero degree class.

Next, a method of determining the parking mode on the basis of the distribution of the angles of inclination will be described.

Figure 9C:
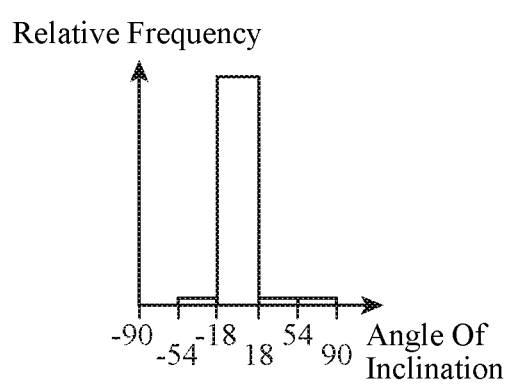
Figure 10B:
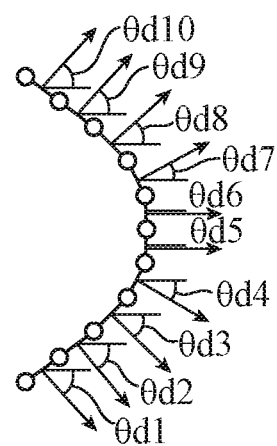

Parallel parking is determined when the distribution of the angles of inclination is concentrated on the zero degree class as illustrated in FIG. 9C, that is, when the distribution range is narrow.

Figure 10C:
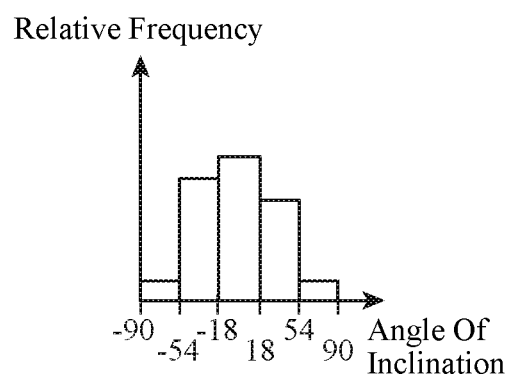

Perpendicular parking is determined when the distribution of the angles of inclination is widely dispersed from around the zero degree class as illustrated in FIG. 10C, that is, when the distribution range is wide.

Angle parking is determined when the distribution of the angles of inclination is skewed toward the class of a positive or negative value as illustrated in FIG. 11C.

A first method of determining the parking mode on the basis of the aforementioned distribution characteristics is to use a mean value and variance of a plurality of angles of inclination in the same group. It is assumed that a table illustrated in FIG. 12 is preset in the parking mode determining unit 7 when the parking mode determining unit 7 employs the first method. A threshold set in the table is used to determine whether the distribution range of the angles inclination is narrow or wide.

The parking mode determining unit 7 creates a histogram by using the plurality of angles of inclination in the same group. The parking mode determining unit 7 then calculates a mean value and variance for this group by using a class value and a frequency of each class. Alternatively, the parking mode determining unit 7 may calculate the mean value and the variance for the plurality of angles of inclination in the same group without creating a histogram.

Then, the parking mode determining unit 7 determines that the parking mode is parallel parking when the mean value equals 0 degree and the variance is smaller than the threshold. The parking mode determining unit 7 determines that the parking mode is perpendicular parking when the mean value equals 0 degree and the variance is larger than or equal to the threshold. The parking mode determining unit 7 determines that the parking mode is angle parking when the mean value equals a value other than 0 degree and the variance is larger than or equal to the threshold.

Note that it is not necessary to strictly determine whether or not the mean value equals 0 degree, but it may be determined whether or not the mean value falls within a predetermined range including 0 degree.

A second method of determining the parking mode is to use a class representing a mode L of a histogram and a ratio L/M of the mode L to the total number M of the angles of inclination. It is assumed that a table illustrated in FIG. 13 is preset in the parking mode determining unit 7 when the parking mode determining unit 7 employs the second method. The ratio L/M has a large value when the distribution range is narrow and has a small value when the distribution range is wide.

The parking mode determining unit 7 creates a histogram by using the plurality of angles of inclination in the same group. Then, the parking mode determining unit 7 determines that the parking mode is parallel parking when a zero degree class represents the mode L and the ratio L/M is larger than or equal to a threshold (such as 0.7). The parking mode determining unit 7 determines that the parking mode is perpendicular parking when the zero degree class represents the mode L and the ratio L/M is smaller than the threshold. The parking mode determining unit 7 determines that the parking mode is angle parking when a class other than the zero degree class represents the mode L and the ratio L/M is larger than or equal to the threshold.

A third method of determining the parking mode uses a class representing a mode L of a histogram and a ratio O/L of a frequency O of a class having the second highest frequency to the mode L. It is assumed that a table illustrated in FIG. 14 is preset in the parking mode determining unit 7 when the parking mode determining unit 7 employs the third method. The ratio O/L has a small value when the distribution range is narrow and has a large value when the distribution range is wide.

The parking mode determining unit 7 creates a histogram by using the plurality of angles of inclination in the same group. Then, the parking mode determining unit 7 determines that the parking mode is parallel parking when a zero degree class represents the mode L and the ratio O/L is smaller than a threshold. The parking mode determining unit 7 determines that the parking mode is perpendicular parking when the zero degree class represents the mode L and the ratio O/L is larger than or equal to the threshold. The parking mode determining unit 7 determines that the parking mode is angle parking when a class other than the zero degree class represents the mode L and the ratio O/L is smaller than the threshold.

Note that the parking mode determining unit 7 may evaluate reliability of the result of the determination of the parking mode in accordance with the number of pieces of reflected position data grouped into the same group. For example, when the number of pieces of reflected position data grouped into the same group is larger than or equal to a predetermined threshold, the parking mode determining unit 7 evaluates that a result of the determination for the group is highly reliable. Conversely, when the number of pieces of reflected position data is smaller than the predetermined threshold, the parking mode determining unit evaluates that the reliability of a result of the determination for the group is low. Note that the parking mode determining unit 7 may evaluate the reliability by a plurality of levels using a plurality of thresholds.

Moreover, when evaluating that the reliability of a result of the determination of the parking mode is low, the parking mode determining unit 7 may output the result of the determination to the output device 18 to inquire a driver whether the result of the determination is correct or not.

Alternatively, the parking mode determining unit 7 may determine not only the parking mode of one parked vehicle by using a result of the determination of the parking mode for one group, but also the parking mode of the entire parking area by using results of the determination of the parking mode for a plurality of groups. For example, the parking mode determining unit 7 determines the parking mode obtained most frequently as a result of the determination among results of the determination of the parking mode for the plurality of groups as the parking mode of the entire parking area. Alternatively, the parking mode determining unit 7 may exclude a result of the determination evaluated to be low in reliability to determine the parking mode of the entire parking area by using the rest of the results of the determination.

Next, the operation of the parking mode determining system 1 will be described.

FIG. 15 is a flowchart illustrating an example of the operation of the parking mode determining system 1. The flowchart of FIG. 15 illustrates an example in which the reflected position calculating unit 4 performs the two-circle intersection processing and the parking mode determining unit 7 determines the parking mode by the second method.

The parking mode determining system 1 proceeds to step ST12 if a start condition for determining the parking mode is satisfied in step ST11 (YES in step ST11), or repeats step ST11 if the start condition is not satisfied (NO in step ST11).

When the start condition is satisfied, in step ST12, the distance measuring unit 2 starts measurement of a distance by using the distance sensors 11 and 12, and at the same time the host-vehicle position measuring unit 3 starts measurement of a position of the host vehicle by using the wheel speed sensors 13 and 14 and the yaw rate sensor 15, or the GPS sensor 16. Then, the distance measuring unit 2 starts outputting distance data to the reflected position calculating unit 4, and the host-vehicle position measuring unit 3 starts outputting host-vehicle position data to the reflected position calculating unit 4.

The start condition for determining the parking mode is a point when the traveling speed of the vehicle 10 equals a predetermined threshold (such as 20 km/h) or lower, for example. In this case, the host-vehicle position measuring unit 3 for example receives values detected from the wheel speed sensors 13 and 14 to calculate the traveling speed, and starts its own operation as well as gives the distance measuring unit 2 a sign to start the operation when the traveling speed equals the threshold or lower.

Alternatively, the start condition for determining the parking mode is a point when a driver gives a sign to start determining the parking mode. In this case, once the driver operates the input device 17 and inputs a sign to start determining the parking mode, the input device 17 outputs a signal for instructing the distance measuring unit 2 and the host-vehicle position measuring unit 3 to start determining the parking mode. Upon receiving this signal, the distance measuring unit 2 and the host-vehicle position measuring unit 3 start the operation.

In step ST13, the reflected position calculating unit 4 performs the two-circle intersection processing by using the distance data received from the distance measuring unit 2 and the vehicle position data received from the host-vehicle position measuring unit 3, thereby calculating reflected position data and outputting the data to the grouping unit 5.

In step ST14, the grouping unit 5 receives the reflected position data from the reflected position calculating unit 4 and then groups the reflected position data by determining whether or not the distance between the reflected position data adjacent to each other is shorter than or equal to a threshold. The grouping unit 5 outputs the reflected position data being grouped to the angle calculating unit 6.

In step ST15, the angle calculating unit 6 receives a plurality of reflected position data in the same group from the grouping unit 5. The angle calculating unit 6 obtains an approximate line for each of two or more of the reflected position data adjacent to each other in the same group and calculates an angle of inclination of the approximate line. The angle calculating unit 6 calculates angles of inclination using all the reflected position data in the same group, and thereafter outputs the calculated angles to the parking mode determining unit 7.

In step ST16, the parking mode determining unit 7 receives the plurality of angles of inclination in the same group from the angle calculating unit 6, and creates a histogram.

In step ST17, the parking mode determining unit 7 determines whether the parking mode of this group is parallel parking, perpendicular parking, or angle parking by using the histogram being created and the table illustrated in FIG. 13, for example. The parking mode determining unit 7 outputs a result of the determination to the parking assistance device 19.

As described above, the parking mode determining system 1 according to the first embodiment includes: the distance measuring unit 2 for measuring a distance to an obstacle on the side of the host vehicle by using a result of transmission and reception of a transmission wave by each of the distance sensors 11 and 12; the host-vehicle position measuring unit 3 for measuring a position of the host vehicle; the reflected position calculating unit 4 for calculating a reflected position of the transmission wave by using the distance measured by the distance measuring unit 2 and the position of the host vehicle measured by the host-vehicle position measuring unit 3; the grouping unit 5 for grouping a plurality of the reflected positions calculated by the reflected position calculating unit 4 for each obstacle; the angle calculating unit 6 for obtaining an approximate line for each of two or more of the reflected positions adjacent to each other among a plurality of the reflected positions grouped into the same group, and calculating an angle of inclination of the approximate line or an angle of inclination of a normal line of the approximate line; and the parking mode determining unit 7 for determining whether a parking mode is parallel parking, perpendicular parking, or angle parking on the basis of a distribution of a plurality of the angles of inclination calculated from the plurality of the reflected positions grouped into the same group. Accordingly, it can be determined automatically whether the parking mode is parallel parking, perpendicular parking, or angle parking.

Moreover, the parking mode determining system 1 according to the first embodiment may include the distance sensors 11 and 12 each for transmitting and receiving a transmission wave that is transmitted laterally from the host vehicle.

Furthermore, the distance sensors 11 and 12 may each be an ultrasonic distance sensor or a radar distance sensor. The ultrasonic distance sensor is inexpensive compared to the radar distance sensor, thereby obtaining the parking mode determining system 1 at low cost. The radar distance sensor uses a radio wave having a longer range than the ultrasonic wave, thereby enabling detection of a farther obstacle to determine the parking mode.

Moreover, according to the first embodiment, the host-vehicle position measuring unit 3 measures the position of the host vehicle by using the GPS sensor 16. As a result, the position of the host vehicle can be measured by using an existing product mounted on the host vehicle. In addition, an absolute position can be measured by positioning using the GPS sensor 16 and is thus useful for automatic parking performed by unmanned traveling.

Alternatively, according to the first embodiment, the host-vehicle position measuring unit 3 may measure the position of the host vehicle by using the traveling speed detected by the wheel speed sensors 13 and 14 and the yaw rate detected by the yaw rate sensor 15. As a result, the position of the host vehicle can be measured by using an existing product mounted on the host vehicle. Moreover, the position of the host vehicle can be measured even when the vehicle travels out of reach of the radio wave from a GPS satellite.

Still alternatively, according to the first embodiment, the host-vehicle position measuring unit 3 may include: the first distance measuring unit 3-1 for measuring a distance traveled by the host vehicle by using the GPS sensor 16 with a measurement error being a sequential error; the second distance measuring unit 3-2 for measuring the distance traveled by the host vehicle by using the wheel speed sensors 13 and 14 each with a measurement error being a cumulative error; and the correction value calculating unit 3-3 for calculating a correction value to be used in measurement of the position of the host vehicle by using the distance traveled which is measured by the first distance measuring unit 3-1 and the distance traveled which is measured by the second distance measuring unit 3-2. This makes it possible to more accurately measure the position of the host vehicle.

Moreover, according to the first embodiment, each of the distance measuring unit 2 and the host-vehicle position measuring unit 3 operates when the host vehicle travels at a predetermined speed or slower. The parking mode determining system 1 can thus start determining the parking mode when the host vehicle enters a parking area, for example. Moreover, the driver need not perform an operation for instructing the parking mode determining system 1 to start determining the parking mode and can thus focus on driving.

Alternatively, according to the first embodiment, the distance measuring unit 2 and the host-vehicle position measuring unit 3 may each operate upon receiving a signal that gives an instruction to start determining the parking mode. The parking mode determining system 1 can thus start determining the parking mode at the time the vehicle 10 is parked.

Moreover, according to the first embodiment, the reflected position calculating unit 4 calculates one reflected position by using the distance measured by the distance measuring unit 2, the position of each of the distance sensors 11 and 12 at the time of the distance measurement, and the direction in which each of the distance sensors 11 and 12 has the maximum directivity, the position of each of the distance sensors being calculated by using the position of the host vehicle. This allows the reflected position to be calculated in a shorter time than when the two-circle intersection processing is performed.

Alternatively, according to the first embodiment, the reflected position calculating unit 4 may calculate one reflected position by performing the two-circle intersection processing while using two sets of the distance measured by the distance measuring unit 2 and the position of each of the distance sensors 11 and 12 at the time of the distance measurement, the position of each of the distance sensors being calculated by using the position of the host vehicle. This makes it possible to calculate the reflected position following the outline of an obstacle more accurately than when the reflected position is calculated by using the direction of maximum directivity. The reflected positions can thus be grouped by the obstacle even when the distance between adjacent obstacles is short.

Moreover, according to the first embodiment, the grouping unit 5 determines that reflected positions adjacent to each other belong to the same group when the distance between the reflected positions adjacent to each other equals a predetermined threshold or shorter. This makes it easy to group the reflected positions.

Moreover, according to the first embodiment, the parking mode determining unit 7 employs the first method to calculate a mean value and variance of a plurality of angles of inclination in the same group and determine the parking mode by using the mean value and the variance. As a result, it can easily be determined whether the parking mode is parallel parking, perpendicular parking, or angle parking.

Alternatively, according to the first embodiment, the parking mode determining unit 7 may employ the second method to create a histogram of the plurality of angles of inclination in the same group and determine the parking mode by using a ratio of a mode of the histogram to the total number of the angles of inclination and a class representing the mode. As a result, the parking mode can be quantified and normalized to be able to implement a determination method independent of the shape of a parked vehicle.

Still alternatively, according to the first embodiment, the parking mode determining unit 7 may employ the third method to create a histogram of the plurality of angles of inclination in the same group and determine the parking mode by using a class representing a mode of the histogram and a ratio of a frequency of a class having the second highest frequency to the mode. As a result, the parking mode can be quantified and normalized to be able to implement a determination method independent of the shape of a parked vehicle.

Moreover, according to the first embodiment, the parking mode determining unit 7 evaluates that reliability of a result of the determination of the parking mode is high when the number of reflected positions grouped into the same group is large, or that reliability of a result of the determination of the parking mode is low when the number of reflected positions is small. Therefore, when a result of the determination has low reliability, it is possible to take measures such as not using the result for parking assistance or making an inquiry to the driver.

Alternatively, according to the first embodiment, the parking mode determining unit 7 determines the parking mode by using results of the determination of the parking mode for a plurality of groups. The reliability of the result of determination can be improved as a result. The parking mode of an entire parking area can be determined as well.

Second Embodiment

Figure 16:
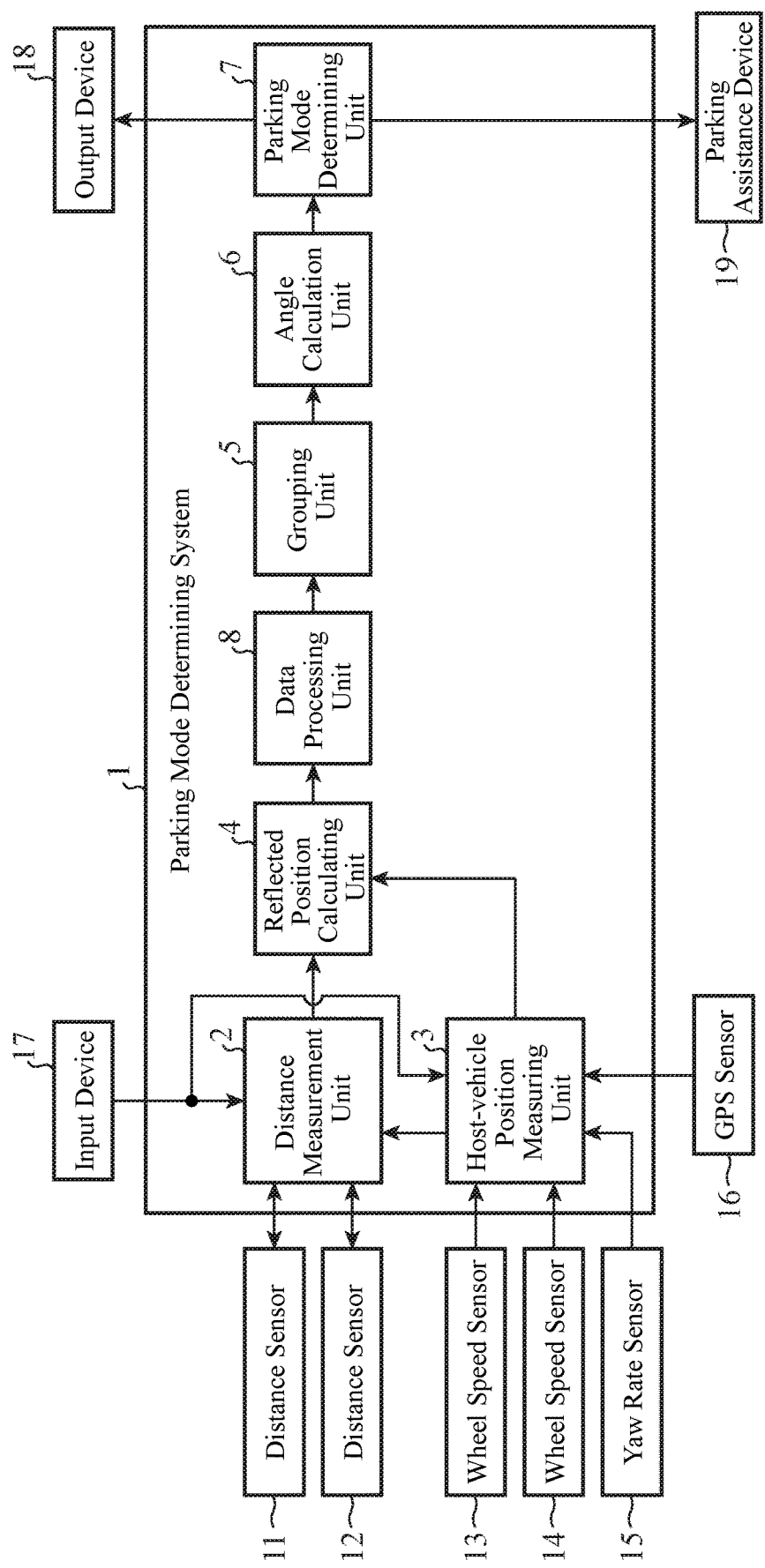
FIG. 16 is a block diagram illustrating an example of the configuration of a parking mode determining system according to a second embodiment of the present invention.

FIG. 16 is a block diagram illustrating an example of the configuration of a parking mode determining system 1 according to a second embodiment. The parking mode determining system 1 according to the second embodiment is configured such that a data processing unit 8 is added to the configuration of the parking mode determining system 1 of the first embodiment illustrated in FIG. 2. In FIG. 16, parts that are identical or equivalent to those in FIGS. 1 to 15 are denoted by the same reference numerals as those assigned to the corresponding parts in FIGS. 1 to 15, whereby the description of such parts will be omitted.

The data processing unit 8 receives reflected position data from the reflected position calculating unit 4 to perform data processing such as deletion of unnecessary reflected position data, interpolation of missing reflected position data, or correction of a numerical value of reflected position data among the reflected position data received, and outputs reflected position data having been processed to the grouping unit 5.

The data processing unit 8 is implemented when the processor 32 illustrated in FIG. 3 executes a program stored in the memory 33.

For example, the data processing unit 8 obtains an approximate curve for all the reflected position data $c1$ to $c7$, $c9$, and $c11$ to $c13$ in FIG. 4 and deletes reflected position data at a position away from the approximate curve by a predetermined threshold or more. FIG. 4 illustrates an example in which the reflected position data $c5$ is deleted by the determination using the threshold.

In addition, the data processing unit 8 may use the approximate curve to interpolate reflected position data for sensor position data with missing distance data. FIG. 4 illustrates an example in which distance data is missing for each of the sensor position data $a8$ and $a10$ at which the distance sensor 11 transmits a transmission wave but cannot receive a reflected wave. The data processing unit 8 sets the distance at which a straight line extending from the sensor position data $a8$ in the direction of maximum directivity B intersects with the approximate curve as distance data $b8$, and sets the position at which the straight line intersects with the approximate curve as reflected position data $c8$.

Similarly, the data processing unit 8 interpolates distance data $b10$ and reflected position data $c10$ with respect to the sensor position data $a10$.

The data processing unit 8 may also interpolate distance data $b5$ and reflected position data $c5$ anew by the above interpolation in place of the reflected position data $c5$ deleted by the determination using the threshold.

The data processing unit 8 may also perform correction such that reflected position data not corresponding to the approximate curve agrees with the approximate curve.

Figure 17:
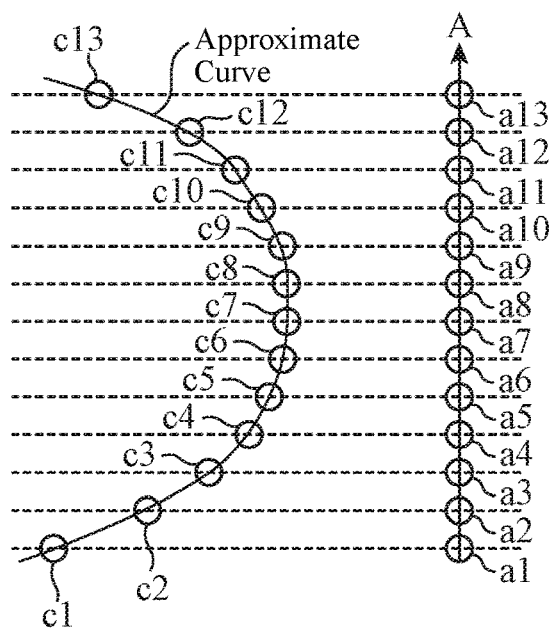
FIG. 17 is a diagram illustrating an example of reflected position data subjected to data processing by a data processing unit of the second embodiment.

FIG. 17 illustrates an example after the reflected position data illustrated in FIG. 4 is deleted, interpolated, and corrected. The reflected position data $c5$ in FIG. 4 located at the position away from the approximate curve by the predetermined threshold or more is deleted, and the new reflected position data c5 is interpolated in FIG. 17.

The distance data and reflected position data are missing for each of the sensor position data a8 and a10 illustrated in FIG. 4, so that new reflected position data c8 and c10 is interpolated in FIG. 17.

The reflected position data c1, c2, c7, c9, c11, c12, and c13 illustrated in FIG. 4 does not agree with the approximate curve and is thus corrected so as to agree with the approximate curve in FIG. 17.

Alternatively, the data processing unit 8 may delete unnecessary reflected position data from among reflected position data obtained by two-circle intersection processing.

For example, the data processing unit 8 determines that the reflected position data c1 is valid and outputs the reflected position data to the grouping unit 5 when the reflected position data c1 is located within a sensor viewing angle of the distance sensor 11 at the sensor position data a1 and a2, or determines that the reflected position data c1 is invalid and deletes the reflected position data c1 when the reflected position data is not located within the sensor viewing angle. It is assumed that information on the sensor viewing angle is preset in the data processing unit 8.

Figure 18:
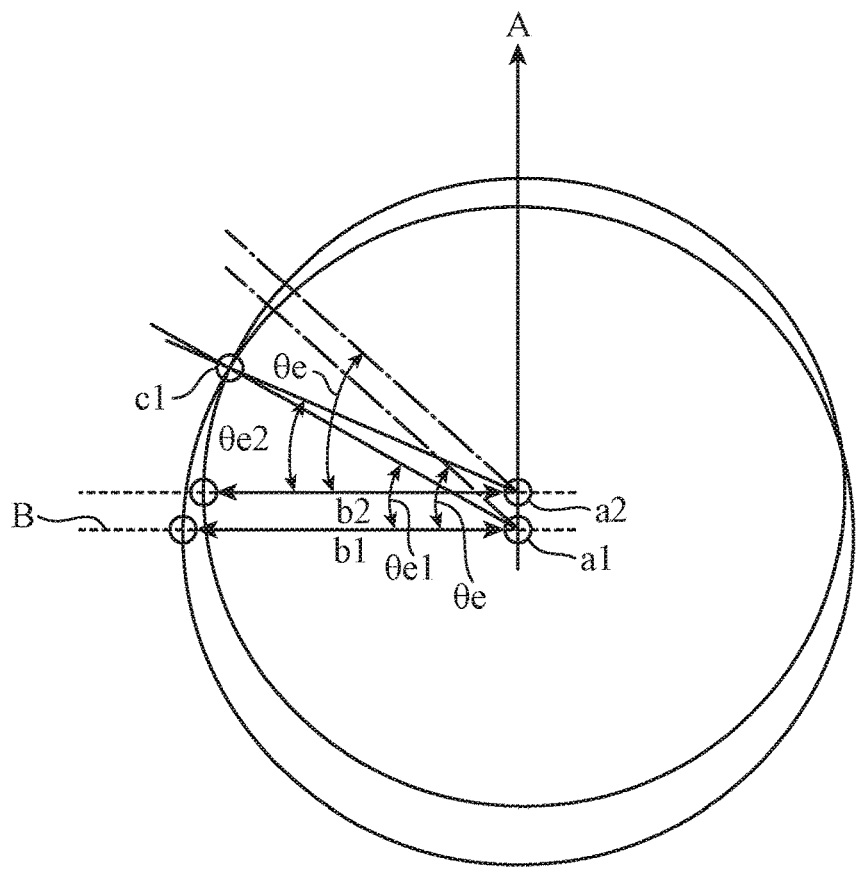
FIG. 18 is a diagram illustrating a method by which the data processing unit of the second embodiment deletes reflected position data obtained by two-circle intersection processing.

Specifically, the data processing unit 8 determines that the reflected position data c1 is valid when angles $\theta e1$ and $\theta e2$ of the reflected position data c1 with respect to the direction of maximum directivity B are within a sensor viewing angle $\theta e$ as illustrated in FIG. 18.

Note that although FIG. 16 illustrates an example in which the data processing unit 8 performs data processing on the reflected position data before being grouped, the data processing unit may instead perform data processing on reflected position data after having been grouped.

That is, the data processing unit 8 performs the aforementioned data processing at least one timing between steps ST12 and ST13, between steps ST13 and ST14, and between steps ST14 and ST15 during a series of processes illustrated by the flowchart in FIG. 15.

As described above, the parking mode determining system 1 according to the second embodiment includes the data processing unit 8 that deletes the reflected position data which is out of the sensor viewing angle of the distance sensors 11 and 12 at the time of the distance measurement, from among the reflected position data calculated by the two-circle intersection processing. Deleting unnecessary reflected position data improves the accuracy of calculation of the angle of inclination and determination of the parking mode.

Third Embodiment

Figure 19:
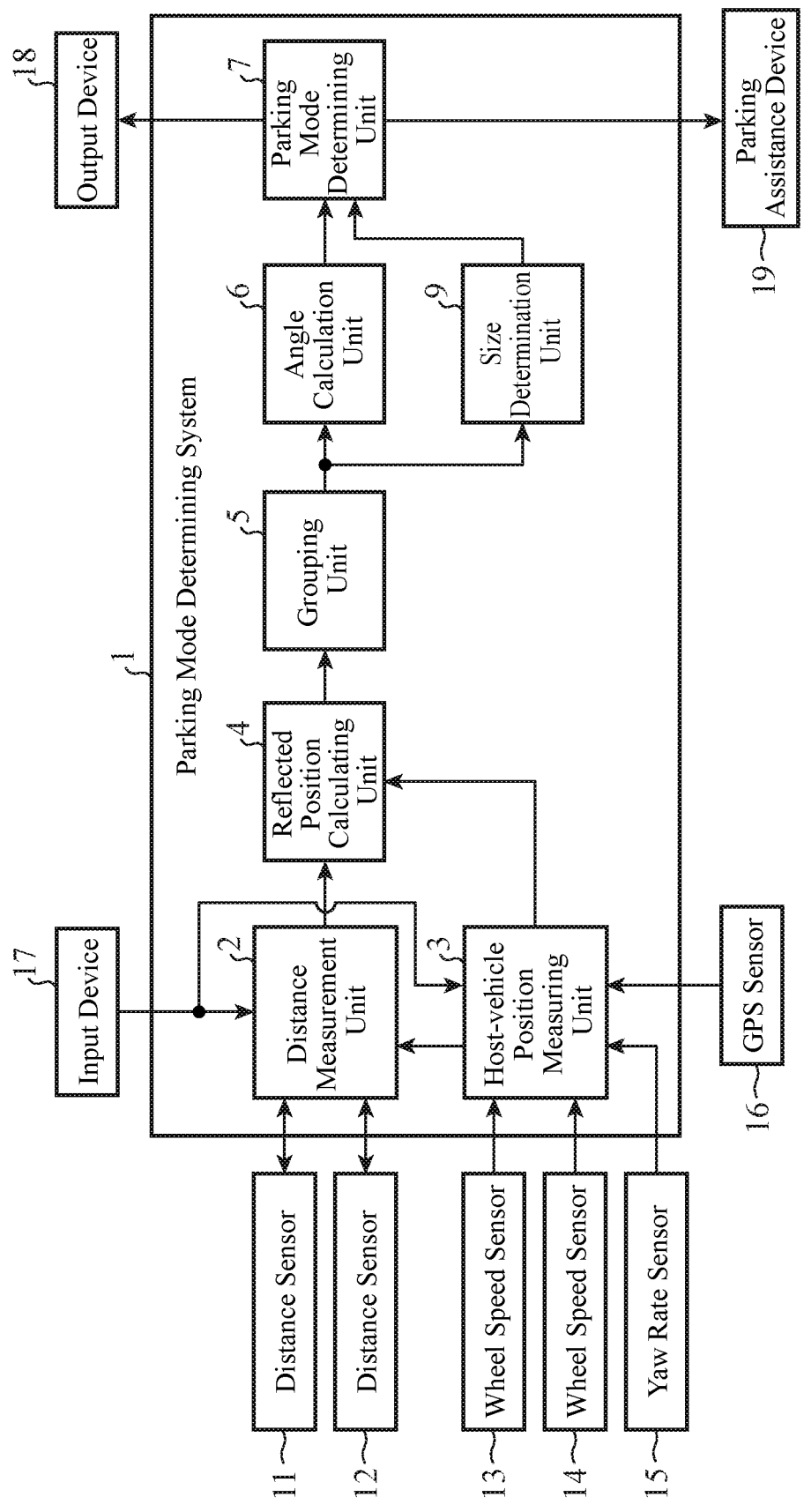
FIG. 19 is a block diagram illustrating an example of the configuration of a parking mode determining system according to a third embodiment of the present invention.

FIG. 19 is a block diagram illustrating an example of the configuration of a parking mode determining system 1 according to a third embodiment. The parking mode determining system 1 according to the third embodiment is configured such that a size determining unit 9 is added to the configuration of the parking mode determining system 1 of the first embodiment illustrated in FIG. 2. In FIG. 19, parts that are identical or equivalent to those in FIGS. 1 to 18 are denoted by the same reference numerals as those assigned to the corresponding parts in FIGS. 1 to 18, whereby the description of such parts will be omitted.

The size determining unit 9 receives a plurality of reflected position data grouped into the same group from the grouping unit 5, calculates a distance between the reflected position data being farthest apart among the plurality of reflected position data, and determines the size of an obstacle for that group. The size determining unit 9 then outputs the determined size to the parking mode determining unit 7.

The size determining unit 9 is implemented when the processor 32 illustrated in FIG. 3 executes a program stored in the memory 33.

The parking mode determining unit 7 compares the size of the obstacle received from the size determining unit 9 with a predetermined threshold to determine the type of the obstacle. The type of the obstacle can be a vehicle, a wall, or a small object, for example. The small object in this case is an obstacle of a size smaller than the vehicle and the wall, and can be a pole, for example.

The threshold is a value by which the obstacle can be determined in accordance with its size, and is preset in the parking mode determining unit 7. The size of the vehicle varies depending on the type such as an ordinary vehicle, a bus, or a truck, so that a range of the threshold with a lower limit set to the overall width of a light vehicle (such as 1 m) and an upper limit set to the overall length of a truck (such as 5 m) is determined in advance and that the obstacle is determined to be a vehicle when the size of the obstacle falls within the range of the threshold, a small object when the size of the obstacle falls below the range of the threshold, or a wall when the size of the obstacle is above the range of the threshold.

Here, there will be described an example of determining the parking mode by using a distribution of angles of inclination included in the same group and the size of an obstacle in the group.

When the parking mode determining unit 7 determines the parking mode by using the second method described in the first embodiment, for example, it is assumed that a table illustrated in FIG. 20 is preset in the parking mode determining unit 7.

The parking mode determining unit 7 creates a histogram by using a plurality of angles of inclination in the same group. In a case where a zero degree class represents a mode L and a ratio L/M is larger than or equal to a threshold (such as 0.7), the parking mode determining unit 7 determines that an obstacle is a parallel parked vehicle when the obstacle size is smaller than the upper limit (such as 5 m) or a wall when the obstacle size is larger than or equal to the upper limit.

In a case where the zero degree class represents the mode L and the ratio L/M is smaller than the threshold, the parking mode determining unit 7 determines that the obstacle is a perpendicular parked vehicle when the obstacle size is larger than or equal to the lower limit (such as 1 m) or a small object when the obstacle size is smaller than the lower limit.

In a case where a class other than the zero degree class represents the mode L and the ratio L/M is larger than or equal to the threshold, the parking mode determining unit 7 determines that the obstacle is an angle parked vehicle when the obstacle size is smaller than the upper limit or a wall when the obstacle size is larger than or equal to the upper limit.

The type of an obstacle is determined on the basis of the size of the obstacle, whereby, for example, each of the reflected position data groups G1 to G3 can be determined to be a vehicle while the reflected position data group G4 can be determined to be a small object equivalent to a pole, among the reflected position data groups G1 to G4 illustrated in FIG. 6. As a result, the parking mode determining unit 7 can determine the parking mode by using only the reflected position data groups G1 to G3 each corresponding to the vehicle to be able to improve the reliability of a result of the determination.

Next, the operation of the parking mode determining system 1 according to the third embodiment will be described.

Figure 21:
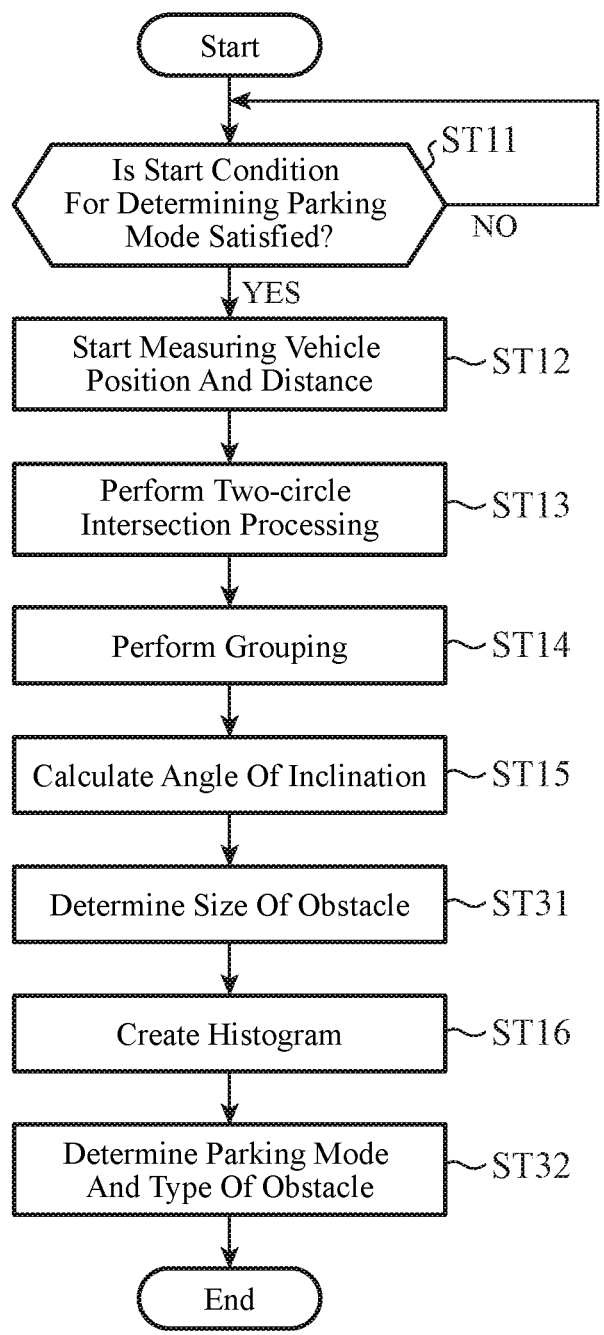
FIG. 21 is a flowchart illustrating an example of the operation of the parking mode determining system according to the third embodiment.

FIG. 21 is a flowchart illustrating an example of the operation of the parking mode determining system 1. In FIG. 21, a step performing the same processing as that in the flowchart of FIG. 15 is denoted by the same reference numeral as that assigned to the corresponding step in FIG. 15, whereby the description of such step will be omitted.

In step ST31, the size determining unit 9 receives a plurality of reflected position data grouped into the same group from the grouping unit 5, determines the size of an obstacle for that group, and outputs a result of the determination to the parking mode determining unit 7.

In step ST32, the parking mode determining unit 7 determines the parking mode and the type of the obstacle of this group by using the histogram created in step ST16 and the table illustrated in FIG. 20, for example. When the type of the obstacle is a vehicle, the parking mode determining unit 7 outputs a result of the determination of the parking mode to the parking assistance device 19.

As described above, the parking mode determining system 1 according to the third embodiment includes the size determining unit 9 that determines the size of an obstacle by calculating the distance between the reflected position data being farthest apart among the plurality of reflected position data grouped into the same group. The parking mode determining unit 7 then determines the parking mode by using the distribution of the angles of inclination calculated by the angle calculating unit 6 and the size of the obstacle determined by the size determining unit 9. The parking mode can be determined in consideration of the size of the obstacle in addition to the distribution of the angles of inclination, whereby the reliability is improved.

Moreover, according to the third embodiment, the size determining unit 9 compares the distance between the reflected positions being farthest apart with the predetermined threshold to determine whether the type of the obstacle is a vehicle, a wall, or a small object smaller than the vehicle and the wall. As a result, the parking mode can be determined on the basis of only a group corresponding to a parked vehicle, whereby the reliability is improved.

Note that the present invention can freely combine the embodiments, modify any component in the embodiments, or omit any component in the embodiments within the scope of the invention.

INDUSTRIAL APPLICABILITY

The parking mode determining system according to the present invention automatically determines whether the parking mode is parallel parking, perpendicular parking, or angle parking, and is thus suitable for use in a parking assistance device or the like that assists a driver with driving a vehicle into a parking space.

REFERENCE SIGNS LIST

1 Parking mode determining system
2 Distance measuring unit
3 Host-vehicle position measuring unit
3-1 First distance measuring unit
3-2 Second distance measuring unit
3-3 Correction value calculating unit
4 Reflected position calculating unit
5 Grouping unit
6 Angle calculating unit
7 Parking mode determining unit
8 Data processing unit
9 Size determining unit
10 Vehicle
11, 12 Distance sensor
13, 14 Wheel speed sensor
15 Yaw rate sensor
16 GPS sensor
17 Input device
18 Output device
19 Parking assistance device
21 Parallel parked vehicle
22 Perpendicular parked vehicle
23 Angle parked vehicle
30 ECU
31 Transmission/reception circuit
32 Processor
33 Memory

The invention claimed is:

1. A parking mode determining system comprising:
a distance measurer to measure a distance to an obstacle on a side of a host vehicle by using a result of transmission and reception of a transmission wave by a distance sensor;
a host-vehicle position measurer to measure a position of the host vehicle;
a reflected position calculator to calculate a reflected position of the transmission wave by using the distance measured by the distance measurer and the position of the host vehicle measured by the host-vehicle position measurer;
a grouping unit to group a plurality of the reflected positions calculated by the reflected position calculator for each obstacle;
an angle calculator to obtain an approximate line for each of two or more of the reflected positions adjacent to each other among a plurality of the reflected positions grouped into a same group, and calculate an angle of inclination of the approximate line or an angle of inclination of a normal line of the approximate line; and
a parking mode determiner to determine whether a parking mode is parallel parking, perpendicular parking, or angle parking on a basis of a distribution of a plurality of the angles of inclination calculated from the plurality of the reflected positions grouped into the same group.

2. The parking mode determining system according to claim 1, wherein the distance sensor is of an ultrasonic type or a radar type.

3. The parking mode determining system according to claim 1, wherein the host-vehicle position measurer measures the position of the host vehicle by using a GPS.

4. The parking mode determining system according to claim 1, wherein the host-vehicle position measurer measures the position of the host vehicle by using a traveling speed detected by a wheel speed sensor and a yaw rate detected by a yaw rate sensor.

5. The parking mode determining system according to claim 1, wherein the host-vehicle position measurer includes:
a first distance measurer to measure a distance traveled by the host vehicle by using a sensor with a measurement error being a sequential error;

a second distance measurer to measure the distance traveled by the host vehicle by using a sensor with a measurement error being a cumulative error; and a correction value calculator to calculate a correction value to be used in measurement of the position of the host vehicle by using the distance traveled which is measured by the first distance measurer and the distance traveled which is measured by the second distance measurer.

6. The parking mode determining system according to claim 1, wherein each of the distance measurer and the host-vehicle position measurer operates when the host vehicle travels at a predetermined speed or slower.

7. The parking mode determining system according to claim 1, wherein each of the distance measurer and the host-vehicle position measurer operates upon receiving a signal that gives an instruction to start determining the parking mode.

8. The parking mode determining system according to claim 1, wherein the reflected position calculator calculates one reflected position by using the distance measured by the distance measurer, a position of the distance sensor at the time of the distance measurement, and a direction in which the distance sensor has the maximum directivity, the position of the distance sensor being calculated by using the position of the host vehicle.

9. The parking mode determining system according to claim 1, wherein the reflected position calculator calculates one reflected position by performing two-circle intersection processing while using two sets of the distance measured by the distance measurer and a position of the distance sensor at the time of the distance measurement, the position of the distance sensor being calculated by using the position of the host vehicle.

10. The parking mode determining system according to claim 9, further comprising a data processing unit for deleting, from among one or more reflected positions calculated by the two-circle intersection processing, a reflected position that is out of a sensor viewing angle of the distance sensor at the time of the distance measurement.

11. The parking mode determining system according to claim 1, wherein the grouping unit determines that reflected positions adjacent to each other belong to the same group when a distance between the reflected positions adjacent to each other is shorter than or equal to a predetermined threshold.

12. The parking mode determining system according to claim 1, wherein the parking mode determiner calculates a mean value and a variance for the plurality of the angles of inclination in the same group to determine the parking mode by using the mean value and the variance.

13. The parking mode determining system according to claim 1, wherein the parking mode determiner creates a histogram of the plurality of the angles of inclination in the same group to determine the parking mode by using a ratio of a mode to the total number of the angles of inclination and a class representing the mode.

14. The parking mode determining system according to claim 1, wherein the parking mode determiner creates a histogram of the plurality of the angles of inclination in the same group to determine the parking mode by using a ratio of a frequency of a class having a second highest frequency to a mode and a class representing the mode.

15. The parking mode determining system according to claim 1, wherein the parking mode determiner evaluates that reliability of a result of the determination of the parking mode is high when the number of reflected positions grouped into the same group is large, or that reliability of a result of the determination of the parking mode is low when the number of reflected positions is small.

16. The parking mode determining system according to claim 1, wherein the parking mode determiner determines the parking mode by using results of the determination of the parking mode for a plurality of groups.

17. The parking mode determining system according to claim 1, further comprising a size determiner to determine a size of an obstacle by calculating a distance between reflected positions that are farthest apart among the plurality of the reflected positions grouped into the same group, wherein the parking mode determiner determines the parking mode by using the distribution of the angles of inclination calculated by the angle calculator and the size of the obstacle determined by the size determiner.

18. The parking mode determining system according to claim 17, wherein the size determiner compares the distance between the reflected positions that are farthest apart with a predetermined threshold to determine whether a type of the obstacle is a vehicle, a wall, or a small object smaller than the vehicle and the wall.

19. The parking mode determining system according to claim 1, further comprising the distance sensor for transmitting and receiving a transmission wave that is transmitted laterally from the host vehicle.

* * * * *